(12) United States Patent
Gharabegian

(10) Patent No.: US 10,327,521 B2
(45) Date of Patent: Jun. 25, 2019

(54) INTELLIGENT SHADING OBJECTS

(71) Applicant: Armen Sevada Gharabegian, Glendale, CA (US)

(72) Inventor: Armen Sevada Gharabegian, Glendale, CA (US)

( * ) Notice: Subject to any disclaimer, the term of this patent is extended or adjusted under 35 U.S.C. 154(b) by 0 days.

(21) Appl. No.: 14/810,380

(22) Filed: Jul. 27, 2015

(65) Prior Publication Data

US 2016/0338457 A1 Nov. 24, 2016

Related U.S. Application Data

(60) Provisional application No. 62/165,859, filed on May 22, 2015.

(51) Int. Cl.
*A45B 19/00* (2006.01)
*A45B 19/04* (2006.01)
(Continued)

(52) U.S. Cl.
CPC .............. *A45B 19/04* (2013.01); *A45B 17/00* (2013.01); *A45B 19/02* (2013.01); *A45B 19/08* (2013.01); *A45B 23/00* (2013.01); *A45B 25/143* (2013.01); *A45B 25/16* (2013.01); *A45B 25/165* (2013.01); *A45B 25/18* (2013.01); *G01C 17/00* (2013.01); *G01J 1/42* (2013.01); *G01J 1/4204* (2013.01); *G01J 1/44* (2013.01); *G01S 3/7861* (2013.01); *G01S 19/14* (2013.01); *G05B 15/02* (2013.01); *A45B 2017/005* (2013.01);
(Continued)

(58) Field of Classification Search
CPC .... A45B 2023/0031; A45B 2023/0043; A45B 2023/0006; A45B 19/02; A45B 2023/006; A45B 2023/0012; A45B 2023/0093; A45B 2019/002; A45B 2019/026; E04H 115/04; E04H 5/26; E04H 15/28; E04H 15/58
See application file for complete search history.

(56) References Cited

U.S. PATENT DOCUMENTS

| 138,774 | A | 6/1873 | Whitcomb |
| 2,070,045 | A | 2/1937 | Gilpin |

(Continued)

FOREIGN PATENT DOCUMENTS

| CH | 203073199 | 7/2013 |
| CN | 202974544 | 6/2013 |

(Continued)

OTHER PUBLICATIONS

Written Opinion of the International Searching Authority, International Application No. No. PCT/US2016/033331, Filing Date: Jul. 27, 2016, Opinion Completed Jul. 27, 2016.
(Continued)

*Primary Examiner* — Daniel P Cahn
*Assistant Examiner* — Jeremy C Ramsey

(57) ABSTRACT

An intelligent shading object, comprises a plurality of shading elements, a shading element deployment mechanism, a support structure, and a base unit. A shading element deployment mechanism deploys a plurality of shading elements independently of each other. A support structure is coupled to the shading element deployment mechanism. A base unit is coupled to the support structure to provide stability to the support structure, the shading element deployment mechanism, and the plurality of shading elements.

20 Claims, 21 Drawing Sheets

(51) Int. Cl.
    *A45B 25/16* (2006.01)
    *A45B 19/02* (2006.01)
    *A45B 23/00* (2006.01)
    *A45B 17/00* (2006.01)
    *G01J 1/42* (2006.01)
    *G01S 3/786* (2006.01)
    *G05B 15/02* (2006.01)
    *A45B 19/08* (2006.01)
    *A45B 25/18* (2006.01)
    *G01C 17/00* (2006.01)
    *G01S 19/14* (2010.01)
    *G01J 1/44* (2006.01)
    *A45B 25/14* (2006.01)
    *A45B 25/00* (2006.01)

(52) U.S. Cl.
    CPC ... *A45B 2019/002* (2013.01); *A45B 2019/026* (2013.01); *A45B 2023/0012* (2013.01); *A45B 2023/0031* (2013.01); *A45B 2023/0093* (2013.01); *A45B 2025/003* (2013.01); *A45B 2200/1018* (2013.01); *A45B 2200/1027* (2013.01); *G01J 2001/4266* (2013.01)

(56) References Cited

U.S. PATENT DOCUMENTS

| | | |
|---|---|---|
| 2,087,537 A | 7/1937 | Finkel |
| 2,485,118 A | 10/1949 | Simpson |
| 3,028,856 A | 4/1959 | Deall |
| 2,960,094 A | 11/1960 | Small |
| 3,917,942 A | 11/1975 | McCay |
| 4,107,521 A | 8/1978 | Winders |
| 4,174,532 A | 11/1979 | Kelley |
| 4,215,410 A | 7/1980 | Weslow et al. |
| 4,684,230 A | 8/1987 | Smith |
| 4,787,019 A | 11/1988 | Van den Broeke |
| 4,915,670 A | 4/1990 | Nesbit |
| 5,002,082 A | 3/1991 | Roder |
| 5,007,811 A | 4/1991 | Hopkins |
| 5,029,239 A | 7/1991 | Nesbit |
| 5,161,561 A | 11/1992 | Jamieson |
| 5,213,122 A | 5/1993 | Grady, II |
| 5,273,062 A | 12/1993 | Mozdzanowski |
| 5,275,364 A | 1/1994 | Burger et al. |
| 5,318,055 A | 6/1994 | Olaniyan |
| 5,321,579 A | 6/1994 | Brown et al. |
| 5,349,975 A | 9/1994 | Valdner |
| 5,683,064 A | 11/1997 | Copeland et al. |
| 5,979,793 A | 11/1999 | Louis |
| 5,996,511 A | 12/1999 | Swoger |
| 6,017,188 A | 1/2000 | Benton |
| 6,027,309 A | 2/2000 | Rawls et al. |
| 6,058,951 A | 5/2000 | Wilson |
| 6,113,054 A | 9/2000 | Ma |
| 6,134,103 A | 10/2000 | Ghanma |
| 6,138,970 A | 10/2000 | Sohrt et al. |
| 6,158,701 A | 12/2000 | Deshler |
| 6,199,570 B1 | 3/2001 | Patarra |
| 6,298,866 B1 | 10/2001 | Molnar, IV |
| 6,302,560 B1 | 10/2001 | Lai |
| 6,347,776 B1 | 2/2002 | Chuang |
| 6,374,840 B1 | 4/2002 | Ma |
| 6,397,869 B1 | 6/2002 | Jennings |
| 6,405,742 B1 | 6/2002 | Driscoll |
| 6,412,889 B1 | 7/2002 | Hummell et al. |
| 6,439,249 B1 | 8/2002 | Spatafora et al. |
| 6,446,650 B1 | 9/2002 | Ma |
| 6,453,621 B1 | 9/2002 | Bundy et al. |
| 6,488,254 B2 | 12/2002 | Li |
| 6,511,033 B2 | 1/2003 | Li |
| 6,519,144 B1 | 2/2003 | Henrie et al. |
| 6,536,721 B1 | 3/2003 | Kao |
| 6,554,012 B2 | 4/2003 | Paterra |
| 6,565,060 B2 | 5/2003 | Li |
| 6,575,183 B2 | 6/2003 | Tung |
| 6,585,219 B2 | 7/2003 | Li |
| 6,598,990 B2 | 7/2003 | Li |
| 6,612,713 B1 | 9/2003 | Kuelbs |
| 6,636,918 B1 | 10/2003 | Aguilar et al. |
| 6,637,717 B2 | 10/2003 | Li |
| 6,666,284 B2 | 12/2003 | Stirm |
| 6,692,135 B2 | 2/2004 | Li |
| 6,785,789 B1 | 8/2004 | Kekre et al. |
| 6,830,058 B2 | 11/2004 | Li |
| 6,837,255 B2 | 1/2005 | Bunch |
| 6,840,657 B2 | 1/2005 | Tung |
| 6,845,780 B2 * | 1/2005 | Bishirjian ............... E04H 15/02 135/96 |
| 6,966,667 B2 | 1/2005 | Li |
| 6,959,996 B2 | 7/2005 | Ip |
| 6,923,193 B2 | 8/2005 | Chen |
| 6,923,194 B2 | 8/2005 | Li |
| 6,941,958 B1 | 9/2005 | Sobek et al. |
| 6,945,263 B2 | 9/2005 | Li |
| 6,961,237 B2 | 11/2005 | Dickie |
| 7,013,903 B2 | 3/2006 | Li |
| 7,017,598 B2 | 3/2006 | Nipke |
| D518,629 S | 4/2006 | Ma |
| 7,034,902 B2 | 4/2006 | Tajima |
| 7,108,388 B2 | 9/2006 | Li |
| 7,111,954 B1 | 9/2006 | Lai |
| 7,128,076 B2 | 10/2006 | Freedman |
| 7,051,744 B2 | 11/2006 | Hung |
| 7,134,442 B2 | 11/2006 | Ma |
| 7,134,762 B2 | 11/2006 | Ma |
| 7,143,501 B2 | 12/2006 | Bramson et al. |
| 7,163,042 B2 | 1/2007 | Li |
| 7,188,633 B2 | 3/2007 | Zerillo |
| D539,632 S | 4/2007 | Ma |
| D558,444 S | 1/2008 | Ma |
| 7,331,684 B2 | 2/2008 | Tung |
| 7,407,178 B2 | 8/2008 | Freedman |
| 7,412,985 B2 | 8/2008 | Ma |
| 7,422,343 B2 | 9/2008 | Li |
| 7,431,469 B2 | 10/2008 | Li |
| 7,481,547 B2 | 1/2009 | Li |
| 7,493,909 B2 | 2/2009 | Ma |
| 7,497,225 B1 | 3/2009 | Klein, Jr. et al. |
| 7,497,583 B2 | 3/2009 | Ma |
| 7,513,479 B2 | 4/2009 | Li |
| 7,533,680 B2 | 5/2009 | Ma |
| 7,559,520 B2 | 7/2009 | Quijano et al. |
| 7,562,667 B2 | 7/2009 | Li |
| 7,593,220 B2 | 9/2009 | Proctor et al. |
| 7,604,015 B2 | 10/2009 | Fraser |
| 7,628,164 B2 | 12/2009 | Ma et al. |
| 7,641,165 B2 | 1/2010 | Li |
| 7,650,230 B1 | 1/2010 | Laverick et al. |
| 7,703,464 B2 | 4/2010 | Ma |
| 7,708,022 B2 | 5/2010 | Ma |
| 7,726,326 B2 | 6/2010 | O'Donnell |
| 7,740,022 B2 | 6/2010 | Li |
| 7,755,970 B2 | 7/2010 | Welker et al. |
| 7,778,624 B2 | 8/2010 | Li |
| 7,784,761 B2 | 8/2010 | Ma |
| 7,798,161 B2 | 9/2010 | Ma |
| D626,324 S | 11/2010 | Ma |
| 7,856,996 B2 | 12/2010 | Ma |
| 7,861,734 B2 | 1/2011 | Ma |
| 7,891,367 B2 | 2/2011 | Ma |
| 7,891,633 B2 | 2/2011 | Li |
| 7,900,643 B2 | 3/2011 | Ma |
| 7,926,496 B2 | 4/2011 | Young et al. |
| 7,926,497 B2 | 4/2011 | Young et al. |
| 7,938,132 B2 | 5/2011 | Li |
| 7,963,293 B2 | 6/2011 | Ma |
| 7,963,295 B2 | 6/2011 | Li |
| 7,975,711 B2 | 7/2011 | Li |
| 8,015,988 B2 | 9/2011 | Li |
| 8,020,572 B2 | 9/2011 | Ma |
| 8,025,071 B2 | 9/2011 | Ma |
| 8,061,374 B2 | 11/2011 | Li |

(56) References Cited

U.S. PATENT DOCUMENTS

| | | |
|---|---|---|
| 8,061,375 B2 | 11/2011 | Ma |
| 8,066,021 B2 | 11/2011 | Ma |
| 8,069,868 B2 | 12/2011 | Kuelbs |
| 8,082,935 B2 | 12/2011 | Ma |
| 8,104,491 B2 | 1/2012 | Li |
| 8,267,104 B2 | 1/2012 | Li |
| 8,116,497 B2 | 2/2012 | Li |
| 8,118,045 B2 | 2/2012 | Li |
| 8,118,046 B2 | 2/2012 | Li |
| D660,137 S | 5/2012 | Ma |
| 8,166,986 B2 | 5/2012 | Ma |
| 8,169,921 B2 | 5/2012 | Li |
| 8,205,656 B2 | 6/2012 | Ma |
| 8,251,078 B2 | 8/2012 | Ma |
| 8,291,923 B2 | 10/2012 | Young et al. |
| 8,297,294 B2 | 10/2012 | Li |
| 8,331,598 B2 | 12/2012 | Li |
| 8,345,889 B2 | 1/2013 | Li |
| 8,356,613 B2 | 1/2013 | Ma |
| 8,360,079 B2 | 1/2013 | Li |
| 8,387,641 B1 * | 3/2013 | Ilan .......... A61G 5/10 135/34.2 |
| 8,393,341 B2 | 3/2013 | Li |
| 8,413,671 B2 | 4/2013 | Li |
| 8,444,104 B2 | 5/2013 | Li |
| 8,453,659 B2 | 6/2013 | Li |
| 8,522,806 B2 | 9/2013 | Li |
| 8,555,905 B2 | 10/2013 | Ma |
| 8,555,906 B2 | 10/2013 | Ma |
| 8,616,226 B2 | 12/2013 | Ma et al. |
| D697,705 S | 1/2014 | Ma |
| 8,632,045 B2 | 1/2014 | Ma |
| 8,636,020 B2 | 1/2014 | Li |
| 8,657,246 B2 | 2/2014 | Ma |
| 8,672,287 B2 * | 3/2014 | Li .......... E04H 12/2238 135/16 |
| 8,727,555 B2 | 5/2014 | Kuelbs |
| 8,740,170 B2 | 6/2014 | Li |
| 8,919,722 B2 | 6/2014 | Ma |
| 8,794,781 B2 | 8/2014 | Kuelbs |
| 8,851,093 B2 | 10/2014 | Li |
| D719,342 S | 12/2014 | Ma |
| D719,343 S | 12/2014 | Ma |
| 8,910,646 B2 | 12/2014 | Li |
| 8,919,361 B2 | 12/2014 | Ma |
| 8,960,625 B2 | 2/2015 | Ma |
| D724,309 S | 3/2015 | Ma |
| 9,030,829 B2 | 5/2015 | Ma |
| D731,166 S | 6/2015 | Ma |
| 9,078,497 B2 | 7/2015 | Ma |
| 9,113,683 B2 | 8/2015 | Ma |
| D738,609 S | 9/2015 | Ma |
| D738,610 S | 9/2015 | Ma |
| 9,125,462 B2 | 9/2015 | Akin |
| 9,192,215 B2 | 11/2015 | Ma |
| 9,220,325 B2 | 12/2015 | Ma |
| 9,237,785 B2 | 1/2016 | Ma |
| 9,241,549 B2 | 1/2016 | Ma |
| 9,289,039 B2 | 3/2016 | Akin |
| 9,345,295 B2 | 5/2016 | Li |
| 9,510,653 B2 | 12/2016 | Akin |
| 2001/0001083 A1 | 5/2001 | Helot |
| 2002/0074027 A1 | 6/2002 | Maidment |
| 2002/0078985 A1 | 6/2002 | Farr |
| 2002/0144721 A1 | 10/2002 | Kronin et al. |
| 2002/0185582 A1 | 12/2002 | Li |
| 2003/0000557 A1 | 1/2003 | Lai |
| 2003/0000559 A1 | 1/2003 | Wu |
| 2003/0192579 A1 | 10/2003 | Llama |
| 2004/0055627 A1 | 3/2004 | Moga |
| 2004/0103934 A1 | 6/2004 | Szumlic |
| 2004/0154653 A1 | 8/2004 | Brutsaert |
| 2004/0228118 A1 | 11/2004 | Peterson |
| 2004/0240167 A1 | 12/2004 | Ledbetter et al. |
| 2004/0261827 A1 | 12/2004 | Chen |
| 2005/0016571 A1 | 1/2005 | Wu |
| 2005/0072451 A1 | 4/2005 | Vivian et al. |
| 2005/0161067 A1 | 7/2005 | Hollins |
| 2005/0279396 A1 | 12/2005 | Choi |
| 2006/0016465 A1 * | 1/2006 | Johannes van Loosbroek ............ A45B 19/00 135/20.1 |
| 2006/0016955 A1 * | 1/2006 | Kao .......... A47F 5/025 248/521 |
| 2006/0124122 A1 | 6/2006 | Young et al. |
| 2006/0127034 A1 | 6/2006 | Brooking et al. |
| 2006/0196532 A1 | 9/2006 | Tung |
| 2007/0040647 A1 | 2/2007 | Saenz et al. |
| 2007/0070588 A1 | 3/2007 | Lin |
| 2007/0126208 A1 | 6/2007 | Freedman |
| 2007/0127231 A1 | 6/2007 | Li |
| 2007/0151588 A1 | 7/2007 | Yul et al. |
| 2007/0211450 A1 | 9/2007 | You |
| 2007/0242450 A1 | 10/2007 | Blatecky |
| 2007/0279856 A1 | 12/2007 | Bragg |
| 2007/0283987 A1 | 12/2007 | Reyes |
| 2008/0056898 A1 | 3/2008 | Li |
| 2008/0076379 A1 | 3/2008 | Li |
| 2008/0092440 A1 | 4/2008 | Johnson |
| 2008/0092936 A1 | 4/2008 | Carabillo |
| 2008/0262657 A1 | 10/2008 | Howell et al. |
| 2009/0056775 A1 * | 3/2009 | Kuelbs .......... A45B 3/04 135/16 |
| 2009/0058354 A1 | 3/2009 | Harrison |
| 2009/0071516 A1 | 3/2009 | Li |
| 2009/0193578 A1 | 8/2009 | Jang et al. |
| 2009/0196020 A1 | 8/2009 | Tsai |
| 2009/0250982 A1 | 10/2009 | Cohen |
| 2009/0277486 A1 | 12/2009 | Stepaniuk et al. |
| 2009/0320827 A1 | 12/2009 | Thompson et al. |
| 2010/0012164 A1 | 1/2010 | Stoelinga |
| 2010/0097441 A1 | 4/2010 | Trachtenberg et al. |
| 2010/0132751 A1 * | 6/2010 | Li .......... A45B 23/00 135/96 |
| 2010/0245032 A1 | 9/2010 | Li |
| 2010/0245503 A1 | 9/2010 | Silverbrook |
| 2010/0320819 A1 | 12/2010 | Cohen et al. |
| 2011/0088734 A1 | 4/2011 | Garcia |
| 2011/0157801 A1 | 6/2011 | Satterfield |
| 2012/0029704 A1 | 2/2012 | Ackermann |
| 2013/0048829 A1 | 2/2013 | Herniak |
| 2013/0306628 A1 | 11/2013 | Volin |
| 2013/0306828 A1 * | 11/2013 | Volin .......... A45B 23/00 248/521 |
| 2014/0041555 A1 | 2/2014 | Ramberg |
| 2014/0317168 A1 | 10/2014 | Suresh |
| 2015/0116485 A1 | 4/2015 | Revankar |
| 2015/0136944 A1 | 5/2015 | Segev |
| 2015/0216273 A1 * | 8/2015 | Akin .......... A45B 25/00 135/16 |
| 2015/0216274 A1 | 8/2015 | Akin |
| 2015/0237975 A1 | 8/2015 | Ng |
| 2015/0245691 A1 | 9/2015 | Fitgerald |
| 2015/0374083 A1 | 12/2015 | Akin |
| 2016/0095398 A1 | 4/2016 | Li |
| 2016/0119699 A1 * | 4/2016 | Caban .......... H04R 1/025 381/120 |
| 2016/0184993 A1 | 6/2016 | Brandwijk |
| 2016/0198818 A1 | 7/2016 | Akin |
| 2016/0326765 A1 | 11/2016 | Barbret |
| 2016/0338457 A1 | 11/2016 | Gharabegian |
| 2017/0055653 A1 | 3/2017 | Gharabegian |
| 2017/0071300 A1 | 3/2017 | Gharabegian |
| 2017/0086545 A1 | 3/2017 | Gharabegian |
| 2017/0086546 A1 | 3/2017 | Gharabegian |
| 2017/0105497 A1 | 4/2017 | Gharabegian |

FOREIGN PATENT DOCUMENTS

| | | |
|---|---|---|
| CN | 203073199 | * 7/2013 |
| CN | 104469162 | 3/2015 |
| CN | 104835334 | 8/2015 |
| CN | 205089186 | 3/2016 |

(56) References Cited

FOREIGN PATENT DOCUMENTS

| | | |
|---|---|---|
| CN | 106163041 | 11/2016 |
| EP | 2479375 | 7/2012 |
| ES | EP 1731055 | 12/2006 |
| FR | 2977457 A1 | 1/2013 |
| GB | WO 2005092140 | 10/2005 |
| RU | 12174 | 12/1999 |
| RU | 2251066 | 4/2005 |
| RU | 47414 | 8/2005 |
| RU | 55459 | 8/2006 |
| WO | WO 03 073884 | 9/2003 |
| WO | WO 2004103113 | 12/2004 |
| WO | WO 2006059334 | 6/2006 |
| WO | WO 2008102403 | 8/2008 |
| WO | WO 2009124384 | 10/2009 |

OTHER PUBLICATIONS

GPS Sun Tracking Solar Panel; Alyammahi et al., published May 7, 2015, accessed Jun. 21, 2017 from https:repository.lib.fit.edu/handle/11141/628?show=full.

Written Opinion and International Search Report for PCT International Application No. PCT/US2018/028281, Federal Institute of Industrial Property, International Filing Date Apr. 19, 2018, dated Sep. 13, 2018.

Written Opinion and International Search Report for PCT International Application No. PCT/US2018/030169, Federal Institute of Industrial Property, International Filing Date Apr. 30, 2018, dated Aug. 9, 2018.

International Search Report, PCT Application No. PCT/US2017/068771, dated May 10, 2018, Federal Institute of Industrial Property, Authorized Officer, A. Chekalkina.

\* cited by examiner

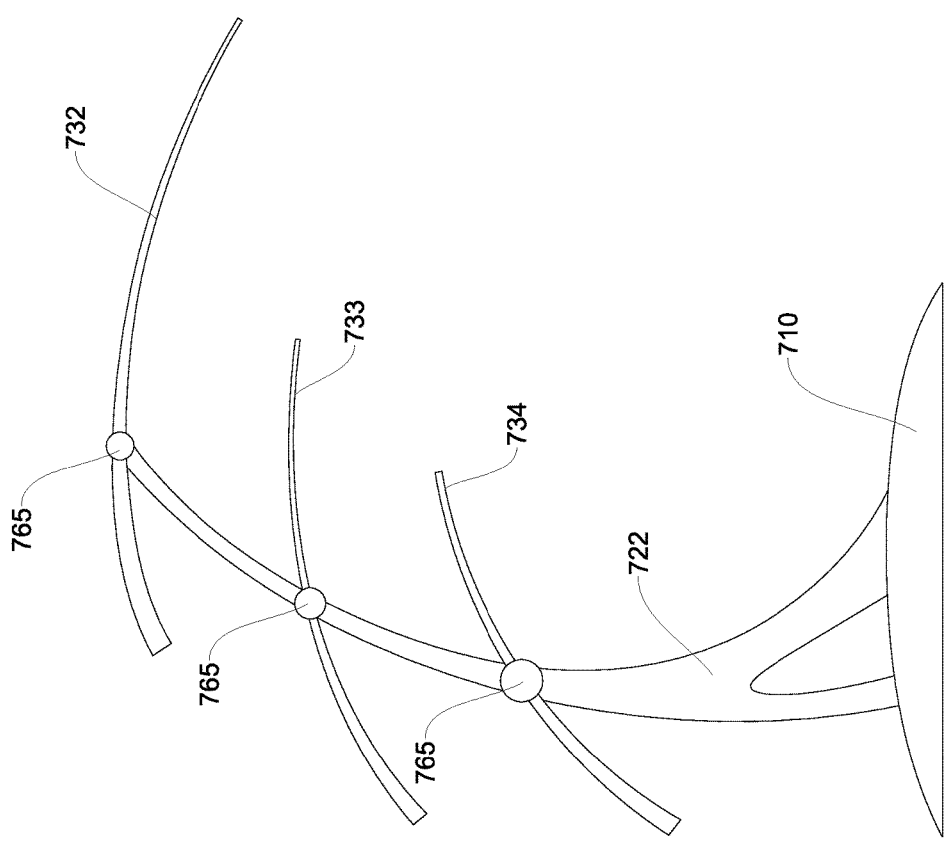

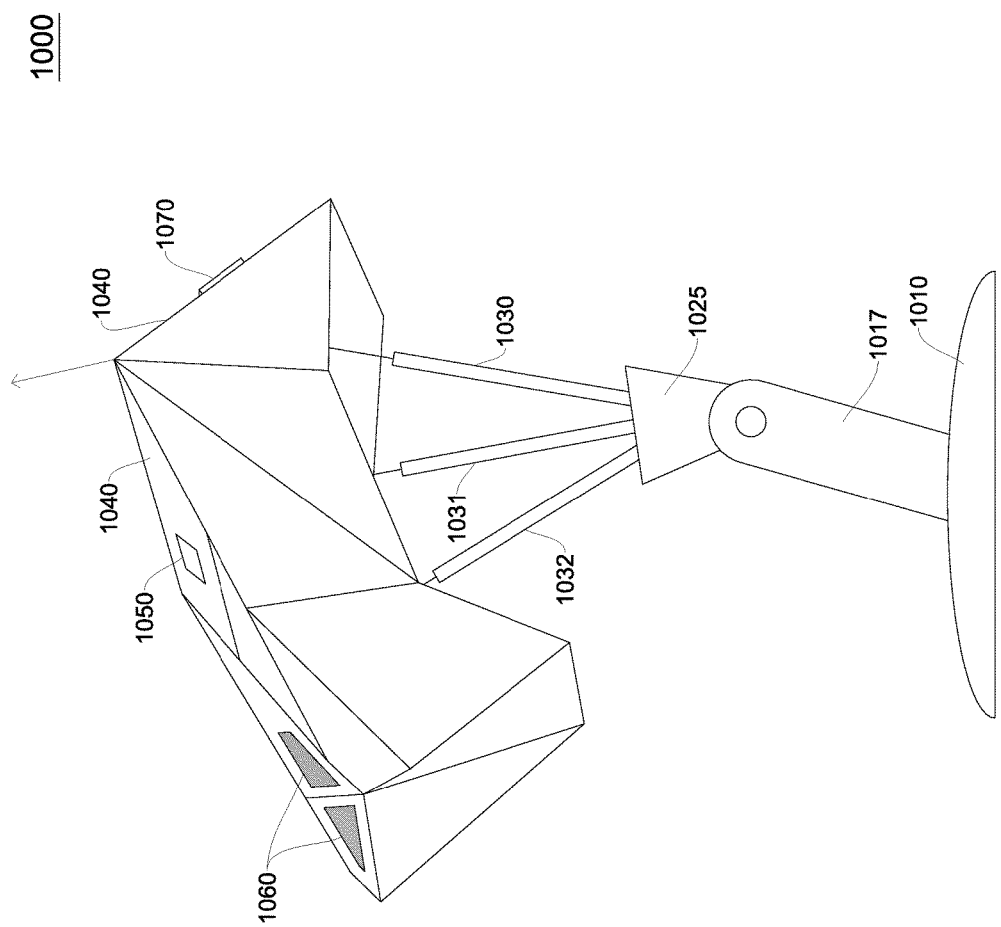

INTELLIGENT SHADING OBJECTS

BACKGROUND

1. Field

The subject matter disclosed herein relates to a methods and systems for providing shade or protection from weather and more specifically to an intelligent sun shading object.

2. Information/Background of the Invention

Conventional sun shading devices usually are comprised of a supporting frame and an awning or fabric mounted on the supporting frame to cover a predefined area. For example, a conventional sun shading device may be an outdoor umbrella or an outdoor awning.

However, current sun shading devices do not appear to be flexible or modifiable or able to adapt to changing environmental conditions or user's desires. Many of the current sun shading devices appear to require manual operation in order to change inclination angle of the frame to more fully protect an individual from the environment. In addition, the current sun shading devices appear to cover a set area that is defined by an area of the awning or umbrella. Further, the current sun shading devices appear to have one (or a single) awning or fabric piece that is mounted to an interconnected unitary frame. An interconnected unitary frame may not be able to be opened or deployed in a situation where only a portion or several portions of the shading object are necessary to be deployed. Accordingly, alternative embodiments may be desired.

BRIEF DESCRIPTION OF DRAWINGS

Non-limiting and non-exhaustive aspects are described with reference to the following figures, wherein like reference numerals refer to like parts throughout the various figures unless otherwise specified.

FIG. 7B illustrates a side view of a third shading object according to an embodiment.

FIG. 10B is a side view of a fourth shading object according to an embodiment.

DETAILED DESCRIPTION

Figure 1A:
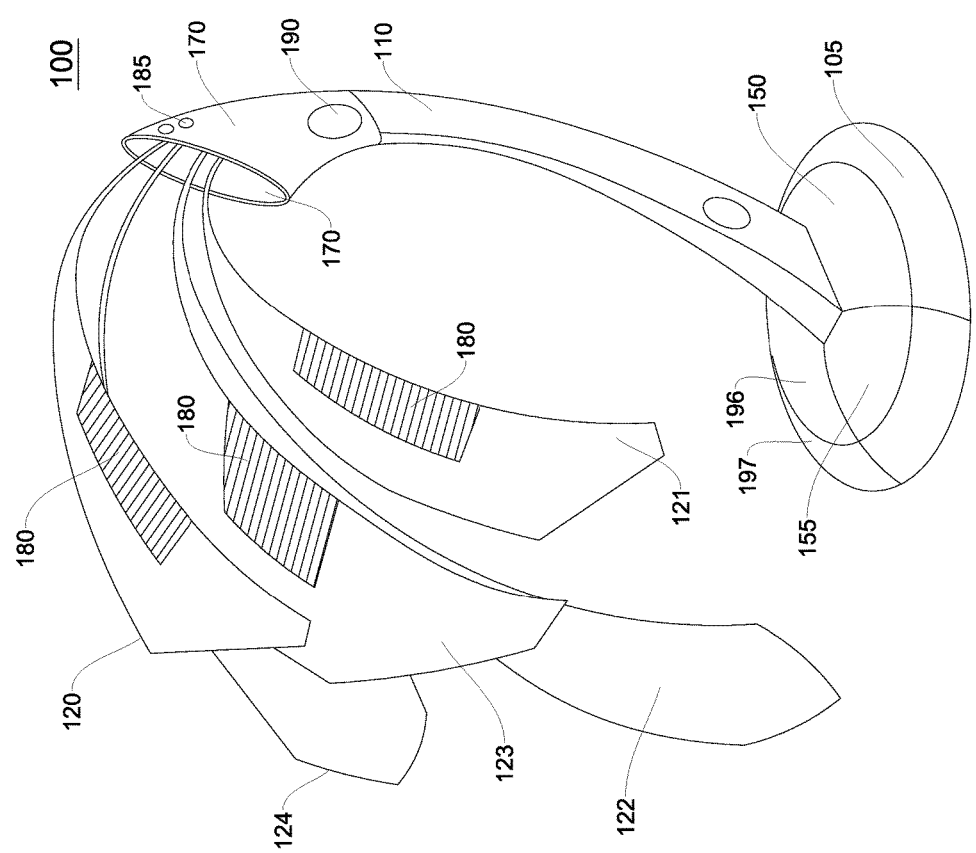
FIG. 1A illustrates a shading object according to an embodiment.

In the following detailed description, numerous specific details are set forth to provide a thorough understanding of claimed subject matter. For purposes of explanation, specific numbers, systems and/or configurations are set forth, for example. However, it should be apparent to one skilled in the relevant art having benefit of this disclosure that claimed subject matter may be practiced without specific details. In other instances, well-known features may be omitted and/or simplified so as not to obscure claimed subject matter. While certain features have been illustrated and/or described herein, many modifications, substitutions, changes and/or equivalents may occur to those skilled in the art. It is, therefore, to be understood that appended claims are intended to cover any and all modifications and/or changes as fall within claimed subject matter.

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

With advances in technology, it has become more typical to employ distributed computing approaches in which portions of a problem, such as signal processing of signal samples, for example, may be allocated among computing devices, including one or more clients and/or one or more servers, via a computing and/or communications network, for example. A network may comprise two or more network devices and/or may couple network devices so that signal communications, such as in the form of signal packets and/or frames (e.g., comprising one or more signal samples), for example, may be exchanged, such as between a server and a client device and/or other types of devices, including between wireless devices coupled via a wireless network, for example.

A network may comprise two or more network devices and/or may couple network devices so that signal communications, such as in the form of signal packets, for example, may be exchanged, such as between a server and a client device and/or other types of devices, including between wireless devices coupled via a wireless network, for example.

In this context, the term network device refers to any device capable of communicating via and/or as part of a network and may comprise a computing device. While network devices may be capable of sending and/or receiving signals (e.g., signal packets and/or frames), such as via a wired and/or wireless network, they may also be capable of performing arithmetic and/or logic operations, processing and/or storing signals (e.g., signal samples), such as in memory as physical memory states, and/or may, for example, operate as a server in various embodiments. Network devices capable of operating as a server, or otherwise, may include, as examples, dedicated rack-mounted servers, desktop computers, laptop computers, set top boxes, tablets, netbooks, smart phones, wearable devices, integrated devices combining two or more features of the foregoing devices, the like or any combination thereof. As mentioned, signal packets and/or frames, for example, may be exchanged, such as between a server and a client device and/or other types of network devices, including between wireless devices coupled via a wireless network, for example. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description a network device (also referred to as a networking device) may be embodied and/or described in terms of a computing device. However, it should further be understood that this description should in no way be construed that claimed subject matter is limited to one embodiment, such as a computing device or a network device, and, instead, may be embodied as a variety of devices or combinations thereof, including, for example, one or more illustrative examples.

Operations and/or processing, such as in association with networks, such as computing and/or communications networks, for example, may involve physical manipulations of physical quantities. Typically, although not necessarily, these quantities may take the form of electrical and/or magnetic signals capable of, for example, being stored, transferred, combined, processed, compared and/or otherwise manipulated. It has proven convenient, at times, principally for reasons of common usage, to refer to these signals as bits, data, values, elements, symbols, characters, terms, numbers, numerals and/or the like. It should be understood, however, that all of these and/or similar terms are to be associated with appropriate physical quantities and are intended to merely be convenient labels.

Likewise, in this context, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term coupled is also understood generically to mean indirectly connected, for example, in an appropriate context. In a context of this application, if signals, instructions, and/or commands are transmitted from one component (e.g., a controller or processor) to another component (or assembly), it is understood that signals, instructions, and/or commands may be transmitted directly to a component, or may pass through a number of other components on a way to a destination component. For example, a signal transmitted from a controller or processor to a motor may pass through glue logic, an amplifier, and/or an interface. Similarly, a signal transmitted through an cooling system may pass through an air conditioning module, and a signal transmitted from a sensor to a controller or processor may pass through a conditioning module, an analog-to-digital controller, and/or a comparison module.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more illustrative examples; however, again, particular context of description and/or usage provides helpful guidance regarding inferences to be drawn.

A network may also include now known, and/or to be later developed arrangements, derivatives, and/or improvements, including, for example, past, present and/or future mass storage, such as network attached storage (NAS), a storage area network (SAN), and/or other forms of computing and/or device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent.

The Internet refers to a decentralized global network of interoperable networks that comply with the Internet Protocol (IP). It is noted that there are several versions of the Internet Protocol. Here, the term Internet Protocol, IP, and/or similar terms, is intended to refer to any version, now known and/or later developed of the Internet Protocol. The Internet includes local area networks (LANs), wide area networks (WANs), wireless networks, and/or long haul public networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices may engage in an HTTP session through an exchange of appropriately compatible and/or compliant signal packets and/or frames. It is noted that there are several versions of the Hypertext Transfer Protocol. Here, the term Hypertext Transfer Protocol, HTTP, and/or similar terms is intended to refer to any version, now known and/or later developed. It is likewise noted that in various places in this document substitution of the term Internet with the term World Wide Web ('Web') may be made without a significant departure in meaning and may, therefore, not be inappropriate in that the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. The Internet and/or Web has evolved to a public, self-sustaining facility that may be accessible to tens of millions of people or more worldwide. Also, in an embodiment, and as mentioned above, the terms "WWW" and/or "Web" refer to a part of the Internet that complies with the Hypertext Transfer Protocol. The Internet and/or the Web, therefore, in this context, may comprise an service that organizes stored content, such as, for example, text, images, video, etc., through the use of hypermedia, for example. A HyperText Markup Language ("HTML"), for example, may be utilized to specify content and/or to specify a format for hypermedia type content, such as in the form of a file and/or an "electronic document," such as a Web page, for example. An Extensible Markup Language ("XML") may also be utilized to specify content and/or format of hypermedia type content, such as in the form of a file or an "electronic document," such as a Web page, in an embodiment. Of course, HTML and/or XML are merely example languages provided as illustrations. Furthermore, HTML and/or XML (and/or similar terms) is intended to refer to any version, now known and/or later developed of these languages. Likewise, claimed subject matter is not intended to be limited to examples provided as illustrations, of course.

Also as used herein, one or more parameters may be descriptive of a collection of signal samples, such as one or more electronic documents, and exist in the form of physical signals and/or physical states, such as memory states. For example, one or more parameters, such as referring to an electronic document comprising an image, may include parameters, such as time of day at which an image was captured, latitude and longitude of an image capture device, such as a camera, for example, etc. In another example, one or more parameters relevant to content, such as content comprising a technical article, may include one or more authors, for example. Claimed subject matter is intended to embrace meaningful, descriptive parameters in any format, so long as the one or more parameters comprise physical signals and/or states, which may include, as parameter examples, name of the collection of signals and/or states (e.g., file identifier name), technique of creation of an electronic document, purpose of an electronic document, time and date of creation of an electronic document, logical path of an electronic document (or portion thereof), encoding formats and/or standards used for encoding an electronic document, and so forth.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated.

It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In an embodiment, a controller typically performs a series of instructions resulting in data manipulation. In an embodiment, a microcontroller may be a compact microcomputer designed to govern the operation of embedded systems in motor vehicles, robots, office machines, complex medical devices, mobile radio transceivers, vending machines, home appliances, and various other devices. In an embodiment, a microcontroller may include a processor, a, and/or peripherals. In an embodiment, a controller may be a commercially available processor such as an Intel Pentium, Motorola PowerPC, SGI MIPS, Sun UltraSPARC, or Hewlett-Packard PA-RISC processor, but may be any type of application-specific and/or specifically designed processor or controller as many other processors and/or controllers are available. In an embodiment, a controller may be connected to other system elements, including one or more memory devices, by a bus. Usually, a processor or controller, may execute an operating system which may be, for example, a Windows-based operating system (e.g., Windows NT, Windows 2000 (Windows ME), Windows XP operating systems) available from the Microsoft Corporation, a MAC OS System X operating system available from Apple Computer, one of many Linux-based operating system distributions (e.g., the Enterprise Linux operating system available from Red Hat Inc.), a Solaris operating system available from Sun Microsystems, or a UNIX operating systems available from various sources. Many other operating systems may be used, and embodiments are not limited to any particular implementation.

The specification may refer to a shading object as an apparatus that provides shade to a user from weather elements. The apparatus may also be referred to as a parasol, umbrella, sun shade, outdoor shade furniture, sun screen, sun shelter, awning, sun cover, sun marquee, brolly and other similar names, which may all be utilized interchangeably in this application. The shading objects described herein include many novel and non-obvious features. The shading objects each comprise a plurality of shading elements. The shading elements may be addressed and/or moved as a group and may be addressed and/or moved separately. Other prior art shade screens or umbrellas are normally comprised of one shading elements.

FIG. 1A illustrates a shading object according to an embodiment. The shading object 100 includes a base unit 105, a central support frame 110, and a plurality of shading elements 120 121 122 123 and 124. In an example embodiment, a base unit 105 may comprise a power cord for connection to an external power source 241 (shown in FIG. 2), for example, an alternating current (AC) power outlet.

Figure 2:
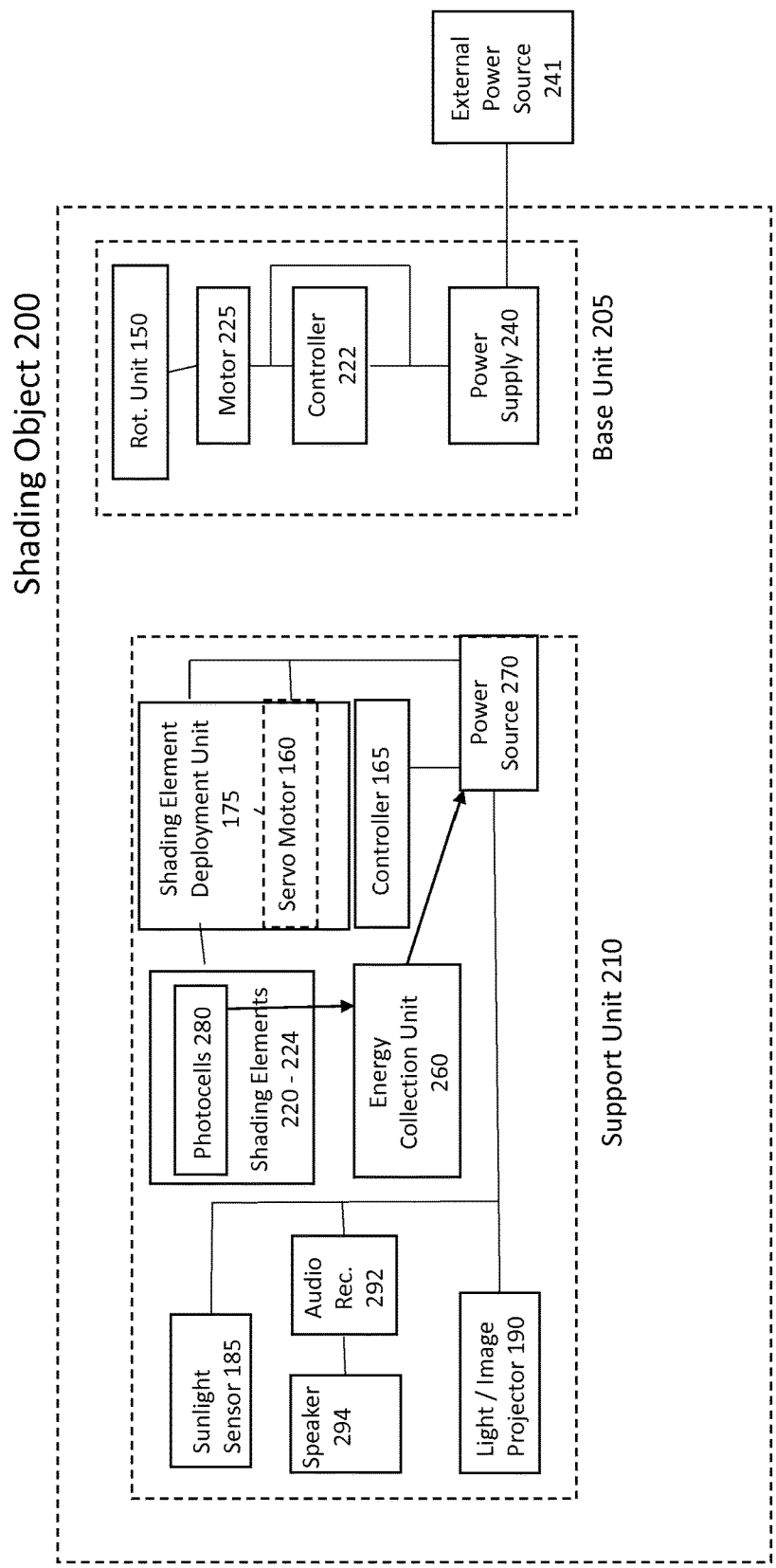
FIG. 2 illustrates a schematic diagram of a shading object according to an embodiment.

FIG. 2 illustrates a schematic diagram of a shading object according to an embodiment. In an example embodiment, a base unit 205 comprises a motor 225, a controller 222, a power supply 240 and a rotation apparatus 150. In an example embodiment, an external power source 241 may provide power to the power supply 240 through a power cord. In another example embodiment, a power source may be a battery may provide backup power for a power supply 240. Continuing with an illustrative embodiment, a power supply 240 may provide power, at different voltage and/or current levels, to a motor 225, a controller 222 and/or a rotation apparatus 226.

In an illustrative embodiment, a base unit 105 may comprise weight compartments 155. In an embodiment, weight compartments 155 may include weights to provide stability for a shading object. For example, one or more weights may be placed into weight compartments 155 to stabilize the shading object 100. By having removable weights, moving the shading object is easier, which increases a shading object's portability. In an example embodiment, weights may be easily removed from the weight compartments and retrieved once weights are needed again to stabilize a shading object. In an example embodiment illustrated in FIG. 1A, one weight compartment 155 is illustrated, but a plurality of weight compartments (and removable weights) may be present in a base unit 105.

In an example embodiment, a support frame 110 may be curved, as is illustrated in FIG. 1A. As is illustrated in FIG. 1A, in an embodiment, a support frame 110 may be connected to a top surface of the base unit 105 via a connection element. In an embodiment, a connection element may be an adhesive (glue, other adhesive materials) or a fastener (including but not limited to screws, nails, nuts and bolts, hinges). In an embodiment, a support frame 110 may comprise a second actuator/motor 160, a second controller 165, shading element storage space 170 and a deployment/retraction apparatus 175. In an example embodiment, a second actuator may be a motor that is responsible for moving or controlling a mechanism or system. An actuator or motor (e.g., second motor 160 or motor 225) may be operated by a source of energy, such as electric current, fluid or pneumatic pressure that is converted in mechanical energy. A linear actuator may be ballscrew actuators, rack and pinion actuators, belt driven actuators, linear motor driver actuators. In an example embodiment, a process may be automated, and a controller may be connected to an actuator, where a controller receives input and provides an output to an actuator to adjust a mechanical aspect of the shading object. In an example embodiment, a motor may any type of motor, including but not limited to: combustion, AC, DC, brushless, servo, stepper or gear motor. In an embodiment, motors 160 or 225 may also be connected to one or more controllers 222 or 165 that can actuate movement of the shading object. In an example embodiment, a controller 222 may connected to a linear actuator or motor 160 or 225 wirelessly as long as a control signal may be received by a shading object.

In an embodiment, there are other methods or devices for providing linear and/or rotation movement in the support frame. The support frame 110, and its position relative to the base unit 105, may be adjusted by user of a rack and pinion, worm gear, barrel cam, or any other form of general motion, for example.

As illustrated in FIG. 1A, the shading object may comprise a storage space 170 that may be located inside the support frame 110. In an example embodiment, the support frame 110 may include an opening at a top surface of the support frame 110. In an example embodiment, for example, when the shading elements are not deployed, the plurality of shading elements 120 121 122 123 and 124 may be resident within a storage space 170. Continuing with an illustrative embodiment, a storage space 170 may comprise channels to provide a structure in an interior portion into which one or more shading elements 120 121 122 123 and/or 124 may be received and/or stored. In alternative embodiments, other storage mechanisms may be utilized to provide a structure to house non-deployed shading elements 120 121 122 123 and/or 124.

Figure 1B:
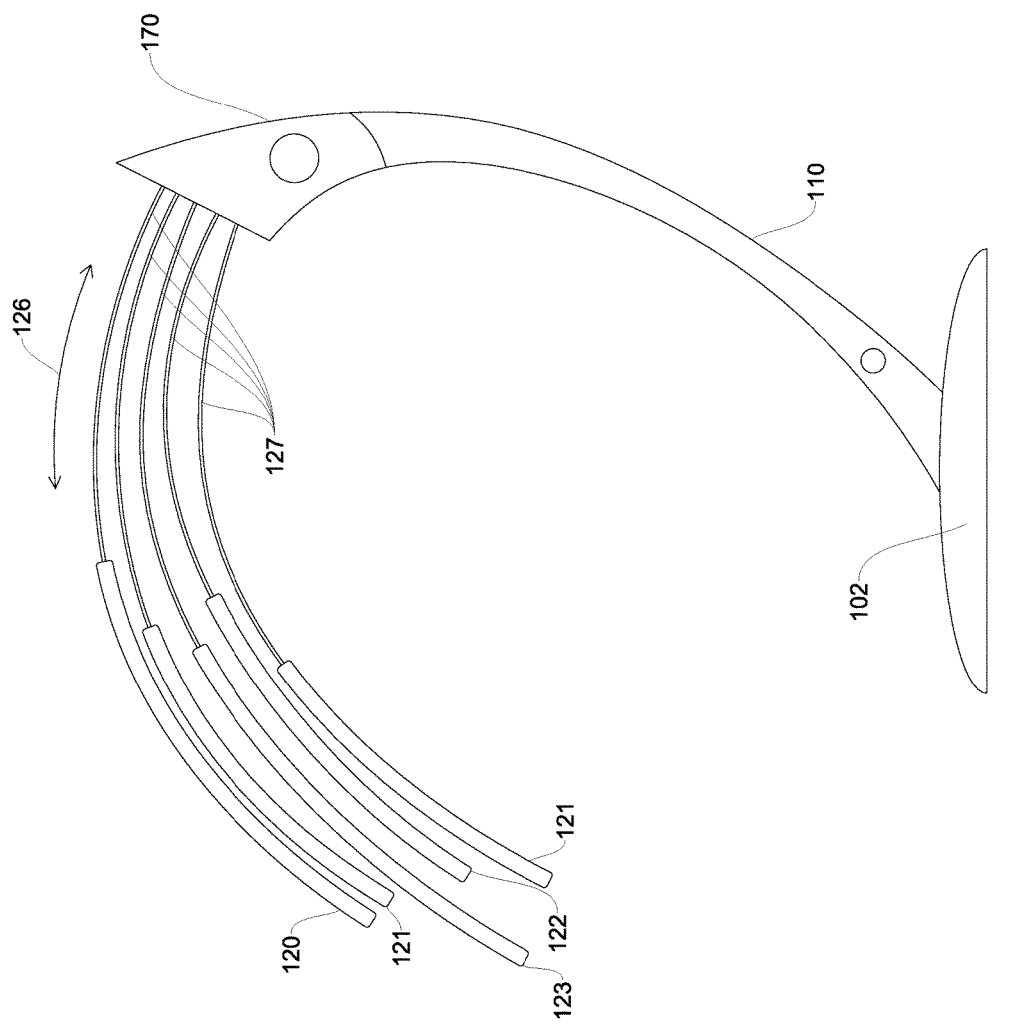
FIG. 1B illustrates a shading object comprising deployed shading objects according to an embodiment.

In an example embodiment, a controller 165 may generate commands, instructions, and/or signals to deploy one or more of a plurality of shading objects 120 121 122 123 and 124. In an embodiment, a motor or actuator 160 may receive a command, instruction, and/or signal, and may generate signals to cause a deployment mechanism 175 to deploy one or more shading elements 120 121 122 123 and 124. In an embodiment, the deployment mechanism 175 deploys one or more of the shading elements 120 121 122 123 124 to a deployed or "providing shade" position from the storage space 170. In an example embodiment, a deployment mechanism 175 may comprise a motor 160 to project or deploy one or more of the shading elements. As illustrated in FIG. 1B, a deployment mechanism or apparatus 175 may deploy one or more of the plurality of shading units 120 121 122 123 and/or 124 in an outwardly direction, as is illustrated by reference number 126 in FIG. 1B. FIG. 1B illustrates a shading object comprising deployed shading objects according to an embodiment.

In an example embodiment, a deployment mechanism 175 may select and/or deploy only one shading element, multiple shading elements, or most of shading elements 120 121 122 123 and 124. In other words, any of a plurality of shading elements may be independently selectable. Continuing with an illustrative embodiment, because the shading elements 120 121 122 123 and 124 are independently selectable, single shading elements may be deployed at a different time, in a different direction, and/or may be deployed partially or fully. In an example embodiment, a deployment mechanism 175 may only deploy the first, third and fifth shading elements. In an example embodiment, a deployment mechanism 175 may deploy one or more of the shading elements a certain distance and not have the shading element extended to a full deployment. This is illustrated in FIG. 1B where shading elements 121 and 123 are deployed out more than shading elements 120 122 and 124. In another example embodiment, a deployment mechanism 175 may not deploy the shading elements in a uniform fashion, for example, where there is one surface that is providing shade to the user (like there is for an umbrella). In the example embodiment illustrated in FIG. 1A, for example, a deployment mechanism may deploy one of the shading elements at a 15-45 degree range horizontally from the center frame (shading element 124) and may deploy one or more of the shading elements at a different height vertically from one or more of the shading elements (e.g., for example shading element 120 versus shading element 123).

Further, in an example embodiment, one or more of a plurality of shading elements may have a different length and/or width as compared to other shading elements 120 121 122 123 and 124. In another example embodiment, one or more of the plurality of shading elements may have a different geometric shape as compared to other shading elements. By having a variety of shading element widths, lengths and/or shapes, an intelligent shading system may be able to provide cover, shade, and/or protection from the elements to many different areas that have unique dimensions and/or spacing. For example, a variety of shading element width, length and/or shapes may allow for the shading element to provide shade to a corner, irregularly shaped area, and/or non-uniform shaped area that a less flexible shading system is not equipped to address.

In an embodiment, a plurality of shading elements may be composed of materials such as plastics, plastic composites, fabric, metals, woods, composites, or any combination thereof. In an example embodiment, the plurality of shading elements 120 121 122 123 and 124 may be made of a flexible material. In an alternative example embodiment, the plurality of shading elements 120 121 122 123 and 124 may be made of a stiffer material.

In an example embodiment, each or some of the plurality of shading elements 120 121 122 123 and 124 may also have an array of photocells 180 disposed on its surface. In the example embodiment illustrated in FIG. 1A, a photocell array 180 may be disposed on or attached to a top surface of one or more of the plurality of shading elements 120 121 122 123 and 124. In an embodiment, solar photovoltaic cells (photocells) 180 may be exposed to sunlight and photon particles in the sunlight may cause a photocell to generate electrical energy, which then is transferred to a power collection unit 260 for storage and later utilization. In embodiments of the invention, the solar energy collection unit 260 may generate enough power to provide voltage and current to other components within the intelligent shading object. In an embodiment, a solar energy collection unit 260 may be coupled to a power unit or supply 270, which may include a battery. In an embodiment, a power unit 270 may be the power source for the entire shading object and in an example embodiment, no external power source may be needed for the intelligent shading object. In an alternative embodiment, an external power supply, such as power source 241 may also or solely supply power to an intelligent shading object.

As is illustrated in the example embodiment of FIG. 1A, a deployment mechanism 175 may deploy a plurality of shading elements 120 121 122 123 124 in a tree-branch like manner. Illustratively, as is shown in FIG. 1A, a deployment mechanism 175 may deploy shading element 120 at a first level which is the highest vertical level, shading element 121 at a second level slightly offset and to a right orientation of shading element 120. Continuing with an embodiment, shading element 122 may be deployed at a lower vertical level compared to shading element 120, but at a higher vertical level and not overlapping with shading element 121. Similarly, in this embodiment, a deployment mechanism may deploy shading elements 123 and 124 at lower vertical levels as compared to shading element 120. Portions of shading elements 120 121 and 122 may overlap different portions of shading elements 123 and 124.

Figure 1C:
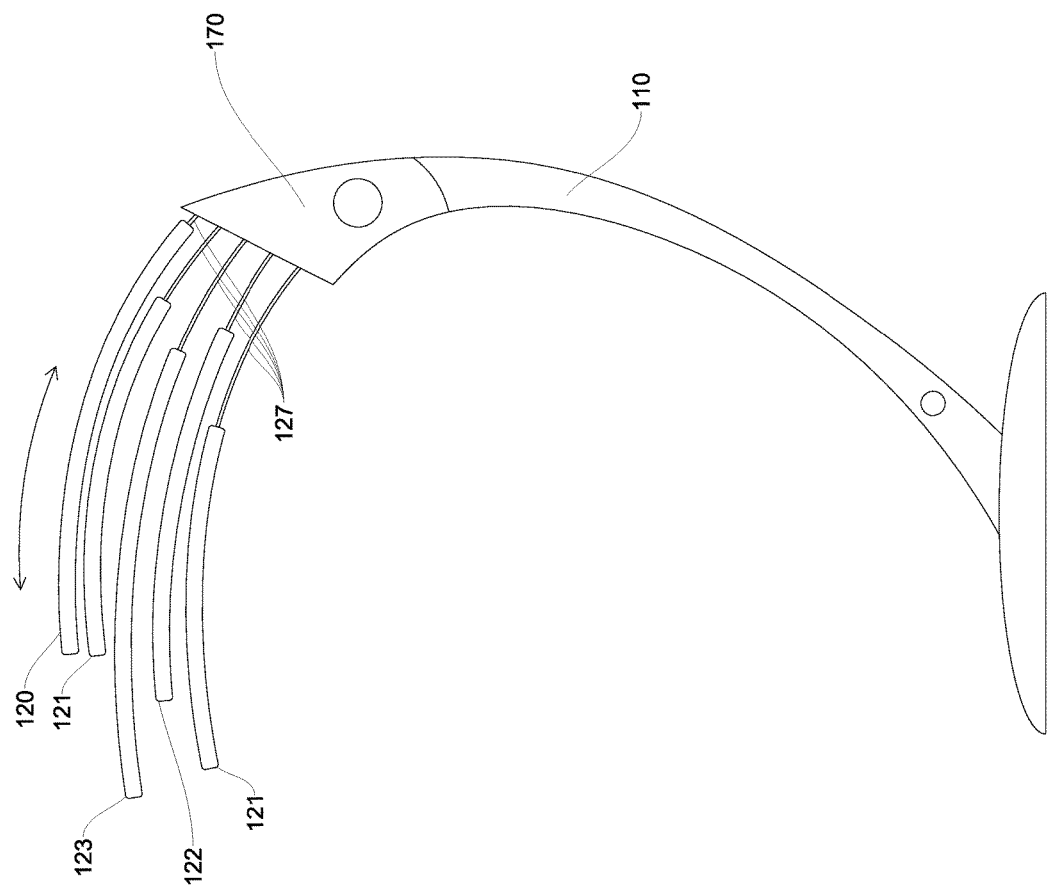
FIG. 1C illustrates a deployment of shading elements according to an embodiment

FIG. 1C illustrates a deployment of shading elements according to an embodiment. In this embodiment, as compared the FIG. 1B, shading elements 120 121 122 123 and 124 are not deployed as far in an outward direction as in FIG. 1B. In an illustrative embodiment, a shading element may thus provide shade and/or protection to an area closer to a central support unit 110 and shading object than when deployed in a more outwardly fashion. In an embodiment, element rods 127 may connect or couple deployment mechanism 175 to the plurality of shading elements 120 121 122 123 and 124.

In an example embodiment, the shading object 100 central support unit 110 may also include a light sensor 185. In an embodiment, a light sensor 185 may be integrated into a central support unit 110 or may be disposed on a surface of a central support unit 110. In an embodiment, a light sensor 185 may detect a direction having the highest light energy and may determine that the solar light source is coming from a specific direction. In an embodiment, a light sensor may be implemented as a single light sensor or may comprise multiple light sensors arranged in a fashion to collect light from different directions. In an example embodiment, a light sensor 185 may identify that a sun (or a light source) is directly overhead or a sun may be located at an angle of 45 degrees from directly overhead. In this example embodiment, a light sensor 185 may transmit this information (via an electrical signal) to a first controller 222. In an embodiment, a first controller 222 may receive a transmitted signal and generate instructions, signals and/or commands to, for example, a motor 225 and then to a rotation unit 150 to cause a base unit 205 to rotate in a direction to adjust shading elements to provide maximum shade for a user. In an example embodiment, if a light source (e.g., a sun) is at a 30 degree angle to the left of the center, then a rotation unit 150 may rotates an interior section of the base unit 205 counterclockwise to cause the support unit 110, and thus the plurality of shading elements 120 121 122 123 and 124 to move to a location to provide shade or protection from the sun or other weather elements. In an embodiment, a first rotation unit 150 may be located in an interior portion of a base unit 105. In this example embodiment, an interior portion of a base unit 105 may rotate, whereas an exterior portion of the base unit 105 may be fixed and not rotate. As illustrated In FIG. 1A, an interior portion 196 may rotates in either a clockwise or counterclockwise direction, whereas exterior portion 197 is stationary. The interior portion 196 of the base unit may coupled to one end of support unit 110.

In an example embodiment, the support unit 110 may comprise a light and/or image projector 190 (reference number 290 in FIG. 2). Light and/or image projector may project light and/or images onto a surface of one or more of a plurality of shading elements 120 121 122 123 and 124. Illustratively, in an embodiment, a surface may be a top surface or a bottom surface of a shading element.

In an example embodiment, a support unit 110 (e.g., 210 in FIG. 2) may comprise an audio transceiver 292 and/or speakers 294. An audio device, such as an iPhone, a digital music player, or the like, may be electronically coupled to the audio transceiver 292 and transmit and/or receive audio signals from the audio device. In an embodiment, an audio transceiver 292 may receive audio signals and transfer audio signals to the speakers 294 so that speakers may reproduce and play sound for shading object users to hear. In an embodiment, audio signals may be transmitted wirelessly between the audio device and the audio transceiver 292, and/or the audio receiver 292 and the speaker 294.

Figure 3:
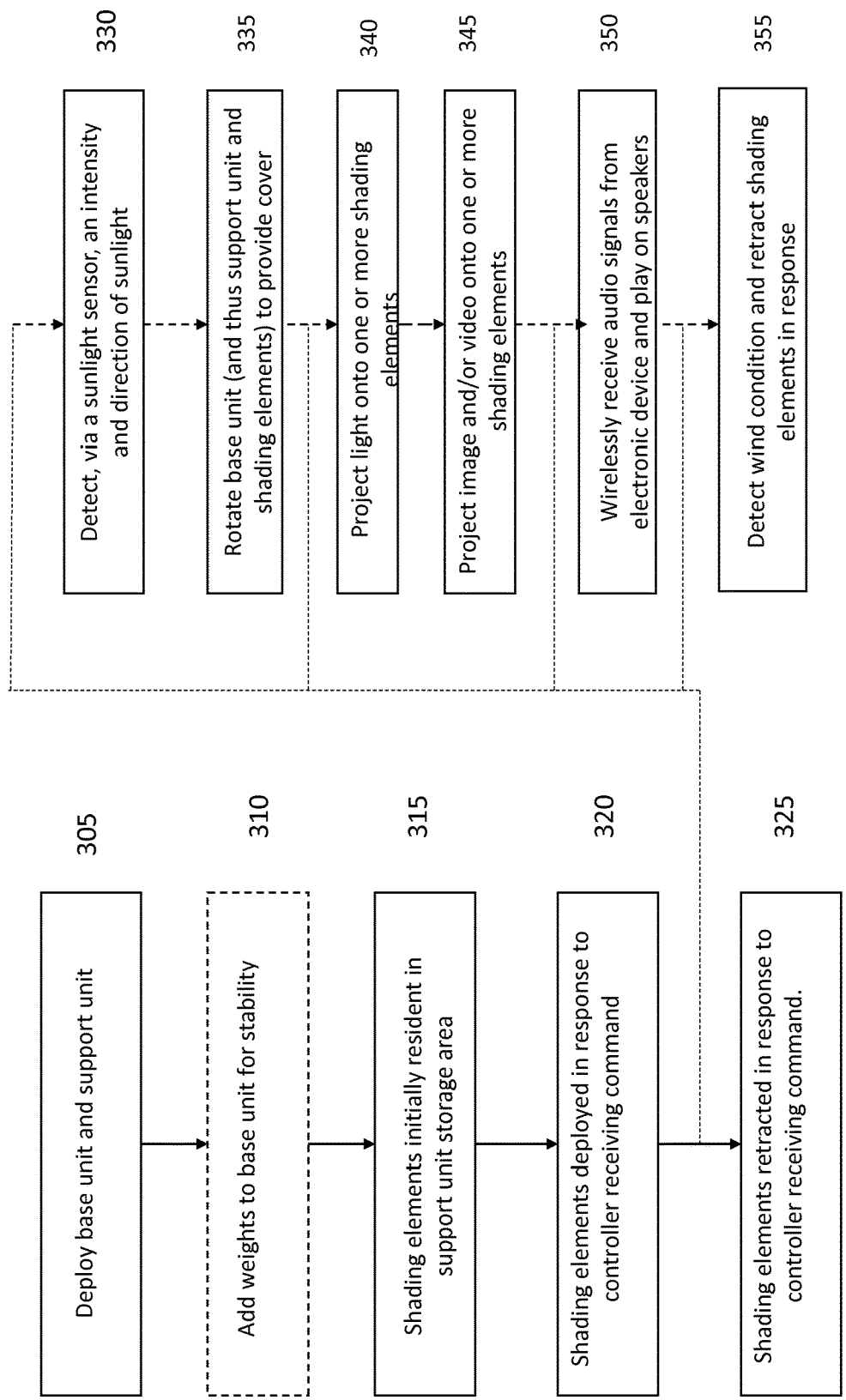
FIG. 3 illustrates a method of deploying a shading object.

FIG. 3 illustrates a method of deploying a shading object according to an embodiment. In an example embodiment, a base system 205 and a support unit 210 may be connected or positioned together and placed 305 in an upright position. In an example embodiment, weights may be added 310 to weight compartments in a base unit 205 in order to provide stability for the shading object 200. In an embodiment, a plurality of shading elements may be stored 315, when the one or more shading elements are not deployed (or are in a retracted position), in a storage area of the support unit 210. Upon receiving instructions from a controller 235, a deployment mechanism may deploy 320 one or more of the plurality of shading elements into a shade or cover position. As noted previously, shading elements do not have to be deployed as a group and may be deployed individually. In an embodiment, after shading object and associated shading elements are no longer needed, a controller may receive a command and a deployment mechanism may retract 325 any of the plurality of shading elements that were previously deployed.

FIG. 3 also illustrates additional features of an intelligent shading object. In embodiments, a shading object may include a sunlight sensor. A sunlight sensor may detect 330 an intensity and/or direction of light from a light source (e.g., sun) and generate a signal that is transmitted to a controller 222 in a base unit 205. The signal may identify that sunlight has been detected at a specific intensity and/or at an angle. In an embodiment, a base unit controller 222 may receive a signal and provide instructions, commands, and/or signals to a base unit rotation unit to rotate 335 an inner portion of a base unit (which is connected to a support unit) in order to change an orientation or direction of a support unit 205 (and thus a plurality of shading elements).

In embodiments, a shading object may also include an illumination source that can project light and/or videos onto surfaces of a shading object. In an example embodiment, a illumination source 290 may project 340 light onto a surface of one or more of the shading elements. Alternatively, or in addition to, in an embodiment, an illumination source may project 345 an image and/or video onto surfaces of one or more of a plurality of shading elements.

In an embodiment, a shading object 200 may include an audio system including a wireless audio receiver 292 and speakers 294. In an embodiment, an audio system may receive 350 audio signals from an electronic device that can wirelessly transmit audio signals. The audio system may cause the received audio signals to be played on speakers for listening enjoyment of the shade object user.

Figure 4A:
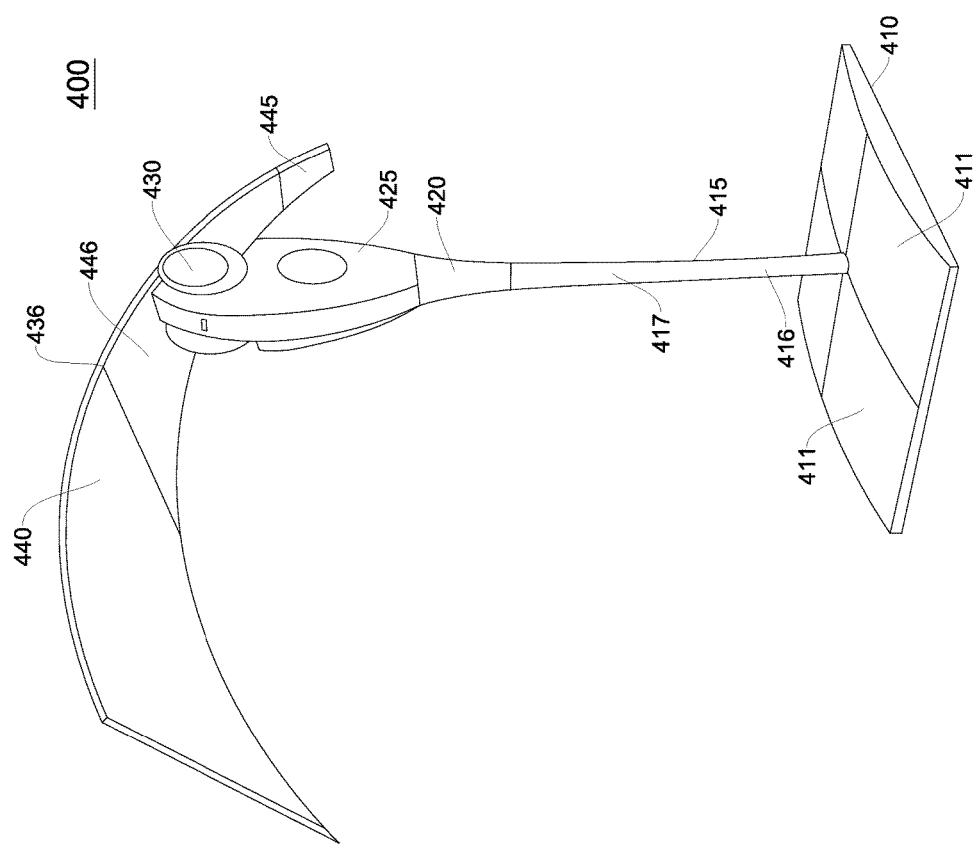
FIG. 4A illustrates a second shading object according to an example embodiment.

In an example embodiment, the shading object may also include a wind sensor. In an embodiment, a wind sensor may detect 355 that the wind velocity is greater than an acceptable value and send a signal to a controller 222 in the support unit 205, which in response to a signal, may generate instructions, commands, and/or signals to transmit to a deployment mechanism to cause a deployment mechanism to retract 230 one or more deployed plurality of shading elements. In an embodiment, retraction may be necessary so that the shading object may not be damaged in high wind conditions and/or injure an individual residing under the shading object FIG. 4A illustrates a second shading object according to an example embodiment. In an embodiment, a shading object 400 illustrated in FIG. 4 may comprise a base unit 410, a support unit 415, a rotation hub assembly 420, a control housing 425, a pivot assembly 430, a shading element frame 435, and/or a shading element 440 or shading elements.

In an example embodiment, a base unit 410 may be rectangular in shape. In alternative example embodiments, a base unit 410 may be circular, square, trapezoidal or any other shape that provides necessary stability for a shading object. In an example embodiment, a base unit 410 may include weight compartments 411 into which removable weights can be placed and/or removed. As illustrated in FIG. 4A, for example, the weight compartments 411 may be rectangular in shape and there may be four, where the four weight compartments may be positioned around a centralized support unit 415. In an example embodiment, a base unit 410 may be connected or coupled to an external power source, such as an AC power source.

In an example embodiment, a support unit 415 may be comprised of a support post 416 and/or a support rod/stem 417. In an embodiment, a support post 416 may be rigid and connected to a central section of a base unit 410. Continuing with an embodiment, an end of a support post 416 may be connected to a support rod/stem 417. In an embodiment, for example, a support rod/stem 417 may be comprised of a plurality of pieces. Continuing with an embodiment, a support rod/stem 417 may also be collapsible. In an embodiment where a support rod/stem 417 is collapsible, a height of an intelligent shading object may be adjustable. In addition, a collapsibility of a support rod/stem 417 provides for easily dismantling and/or storage of the shading object 400.

In an embodiment, a rotational hub 420 may be connected to a support rod/stem 417. In an embodiment illustrated in FIG. 4A, a rotational hub 420 may be connected a top portion of the support rod/stem 417. In an example embodiment, a rotational hub 420 may be comprised of a housing, bearings, and a controller/motor. Continuing with an example embodiment, a rotational hub 420 may be comprised of any assembly allowing circular movement in a horizontal plane. In an example embodiment, a rotational hub 420 may be connected to a control housing 425. Continuing with an example embodiment, a control housing 425 may be connected to a pivot assembly 430, which in turn may be connected to a shading element support frame 435, to which a shading element (or shading elements) 440 may be attached. In an embodiment, a pivot assembly 430 may be connected to a plurality of shading element frames to which shading elements may be attached. In an embodiment, a control housing 425 may rotate 360 degrees, a shading element 440 (or shading elements) may also rotate 360 degrees, and thus may be able to track a light source (e.g., a sun). In an example embodiment, if a rotational hub 420 rotates in first direction, a shading element frame 435, and/or a shading element 440 may rotate in the corresponding first direction because of a connection and/or coupling of a rotational hub 420 to a control housing 425 and/or a pivot assembly 430.

Figure 5:
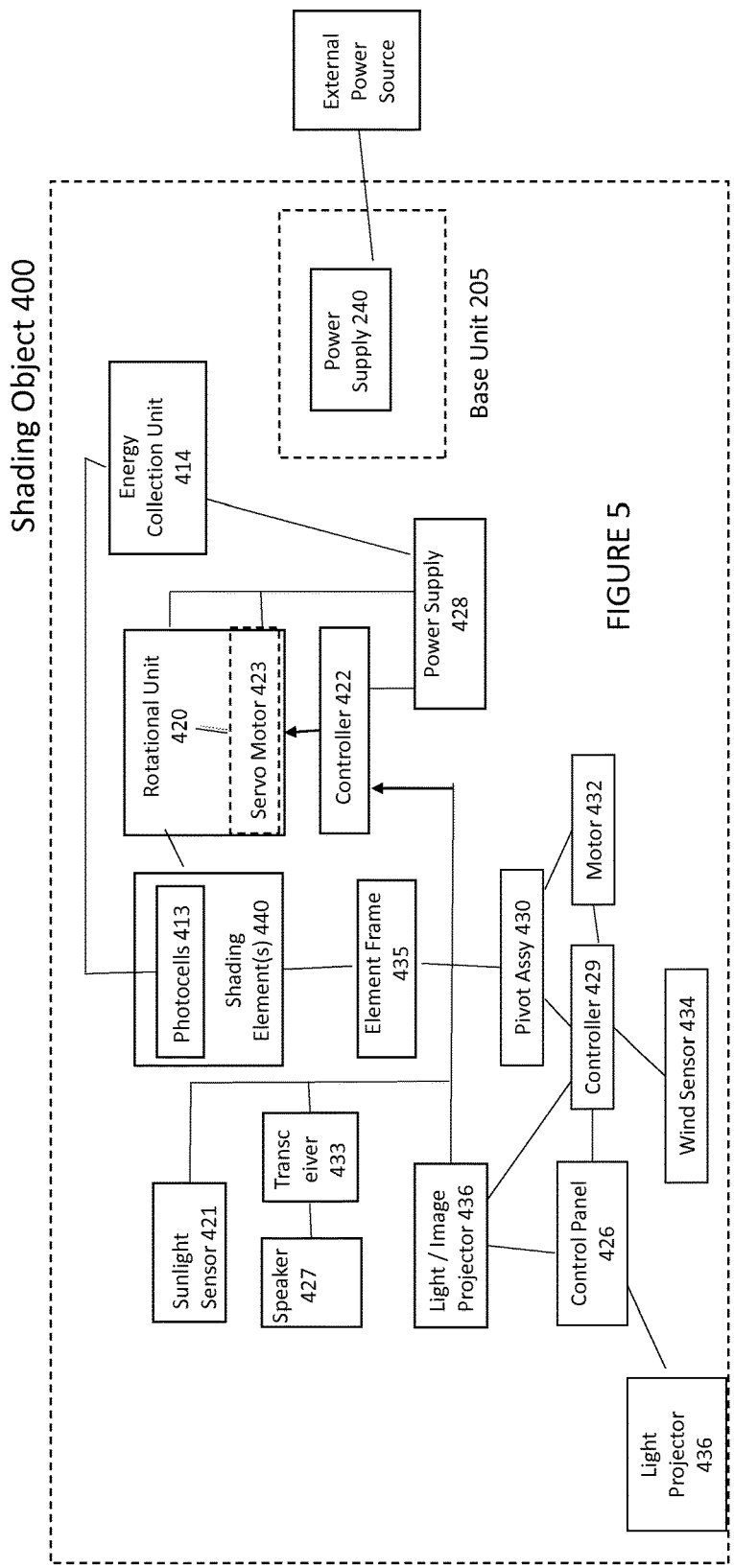
FIG. 5 illustrates a block diagram on a second shading object according to an embodiment.

In the example embodiment illustrated in FIG. 4A and FIG. 5, a rotational hub 420 and/or a control housing 425 may comprise a tracking sensor (or sunlight sensors) 421, a first controller 422, and a first motor 423. In an example embodiment, a tracking sensor (or sensors) 421 may be capture light intensity from a light source, which causes tracking sensors 421 to generate a signal indicative of a direction and/or intensity of light. In an embodiment, a tracking sensor 421 may be coupled to a first controller or processor 422 and generated signals may be transferred to a controller or processor 422. In an example embodiment, the controller or processor 422 may receive the generated signal, process the signal to identify an intensity and/or direction of sunlight, and transmit a signal and/or a command directly or indirectly to a first motor 423 to cause the rotational hub 420 to rotate in a direction that tracks a light source, such as a sun. This may result in a shading element 440 rotating in a direction to track a sun. Illustratively, rotation of the rotational hub 420 causes a control housing 425, a pivot unit 430, a shading element frame 435 and/or a shading element 440 to move in the corresponding clockwise or counterclockwise direction about a central axis.

In an example embodiment, a housing unit 425 may comprise a control panel 426, speaker(s) 427, a power source 428, a second controller or processor 429 and a second motor 432. In an embodiment, a control panel 426 may allow a user to control operation of a shading object 400. In an example embodiment, a wireless transceiver 433 may receive transmitted audio signals from a computing device. Continuing with an embodiment, a wireless transceiver may be coupled to speaker(s) 427 and may transmit the audio signals to the speakers 427 to cause sound to be produced or played. In an example embodiment, a pivot assembly 430 may include a wireless transceiver 433 and speaker(s) 427, and a wireless transceiver 433 and speakers 427 may not be installed in the housing unit 425.

FIG. 5 illustrates a block diagram on a second shading object according to an embodiment. In an example embodiment, a housing unit 420 may also include a wind sensor 434. As noted previously, a wind sensor 434 may monitor wind conditions and transmit a signal to the controller or processor 429 indicative of wind conditions in the area or environment in which the shading object is installed and/or located. The controller or processor 429 may process a signal from the wind sensor and if a signal identifies wind conditions higher than a set threshold, a controller or process 429 may generate a command to, directly or indirectly, instruct a pivot assembly 430 (with or without the motor 432) to lower a shading element support frame 435 (and thus the shading element 440) to protect a shading element from being damages in a threatening wind condition. In another embodiment, a pivot assembly 430 may include the controller (or processor) and/or a wind sensor 434, rather than a housing unit 425.

In embodiments, a housing unit 425 may include a light projector 436. In an alternative embodiment, a pivot assembly 430 may include a light projector 436 rather than a housing unit. As discussed previously, in an example embodiment, a projector 436 may transmit light and/or images to be displayed and/or projected onto shading elements 440. In an embodiment, a controller or processor 429 may generate a signal and/or instructions which are transmitted, directly or indirectly, to a projector 436 to cause the light and/or images to be displayed on a shading element and/or a section of a shading object.

In an embodiment, an intelligent shading object may have a shading element frame 435 and/or a shading element 440 (or elements) moved to a number of positions. In an example embodiment, a control panel 436 may control movement of a shading element frame 435. In an example embodiment, a controller or processor 429 may receive a signal and/or commands from control panel 426 (or another external source) identifying an intended movement of a shading element support frame 435 (and thus a shading element (or shading elements)). In an embodiment, a controller or processor 429 may generate and then transmit a signal and/or command, directly or indirectly, to a second motor 432. In an embodiment, a second motor 432 may receive the signal from a controller and may generate a signal to control and/or direct movement of a pivot assembly 430. In an example embodiment, a pivot assembly 430 may move in clockwise or counterclockwise direction and cause a shading element frame 435 and thus a shading element 440 to move in an up and down, or vertical, direction.

In an example embodiment, a pivot assembly 430 may be coupled to a control housing 425 and a shading element frame 435. In embodiments, a gearing system may couple a pivot assembly 430 to a control housing 425. In an illustrative embodiment, a shading element 440 may move from a position where that is parallel to a support unit 415 (e.g., a rest position) to a position where a shading element 440 (or shading elements) is perpendicular to a support unit 415, which may be referred to as an engaged or "shade" position.

In an example embodiment, a shading element frame 435 may comprise a counterweight assembly 445. For example, a counterweight assembly 445 may offset the weight of a shading element and provide stability to a shading object 400.

In an example embodiment, the shading element may be of many different shapes and sizes. Illustratively, as shown in FIG. 4A, a shading element 440 may cover a portion and not the entirety of the shading element frame 435. As illustrated in FIG. 4A, A shading element 440 includes an opening 446 where no there is no shading element portion. Thus, in an example embodiment, a shading element 440 may cover a specific area. For example, in an embodiment, a shading element frame 435 may have a length and a width and the shading element 440 may cover the width and a portion of the length of the shading element frame 435.

In an example embodiment, a shading element 440 may comprise photocells 413 on a top surface of a shading element 440. In an embodiment, photocells 413 may be exposed to sunlight and the photon particles may cause the photocells to generate electric energy. Electric energy is stored in an energy collection unit 414, which may comprise a memory. In an embodiment, energy in energy collection unit 414 may transfer power to a power unit or supply 428.

Figure 6:
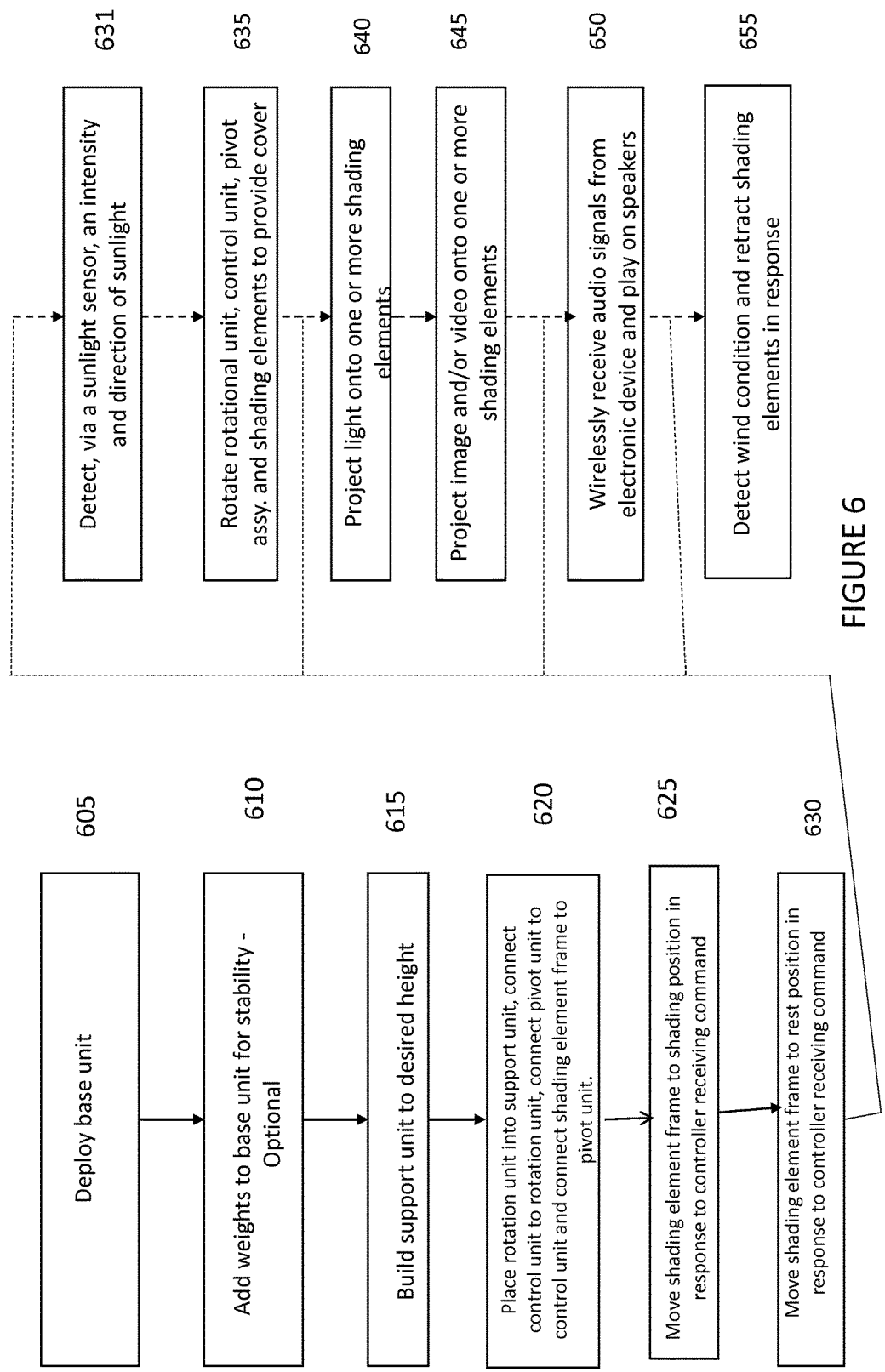
FIG. 6 illustrates a method of operating a second shading object according to an embodiment.

FIG. 6 illustrates a method of operating a second shading object according to an embodiment. In an example embodiment, a base unit 410 may be deployed 605. Weights may be added 610 into a base unit 410 for stability of the shading object. In an embodiment, a support unit may be built 615 to a desired height. In an example embodiment, a rotation unit may be placed or inserted 620 into a support unit. In an embodiment, a control unit or assembly may be placed into or connected into a control unit. Continuing with an embodiment, a pivot unit may be placed into, connected into, or integrated into a control unit. In an embodiment, a shading element may be fastened, connected or coupled to a pivot unit. In an embodiment, a controller or processor may receive a command and send instructions to move a shading element frame to a shading position 625 and accordingly move a shading element. In an embodiment, a controller or processor may move 630 the shading element frame to a rest position in response to the controller receiving command.

In embodiments, the shading object may include a sunlight sensor. In an embodiment, a sunlight sensor may detect 631 an intensity and/or direction of light from a sun and generate a signal that is transmitted to a controller or processor 422. In an embodiment, a signal may identify that sunlight has been detected at a specific angle and/or intensity. In an embodiment, a controller or processor 422 may receive a signal and provide instructions, directly or indirectly, to a rotation unit 420 to rotate 635 a control unit 425 (which is connected to the pivot assembly 430 and shading element frame 435) in order to change an orientation or direction of the shading element frame 435 (and thus a shading element 440 or shading elements).

In embodiments of the invention, a shading object may also include an illumination source that can project light and/or videos onto surfaces. In this example embodiment, the light projector 436 may project 640 light onto a surface of one or more of a plurality of shading elements 440. Alternatively, or in addition to, an illumination source 436 may project 645 an image and/or video onto surfaces of one or more of the plurality of shading elements 440.

In embodiments of the invention, a shading object 400 may include an audio system including a wireless transceiver receiver 433 and/or speakers 427. In embodiments, an audio system may receive 650 audio signals from an electronic device that can wirelessly transmit audio signals. In an embodiment, an audio system may cause received audio signals to be played on speakers for listening enjoyment of an intelligent shading object user.

Figure 4B:
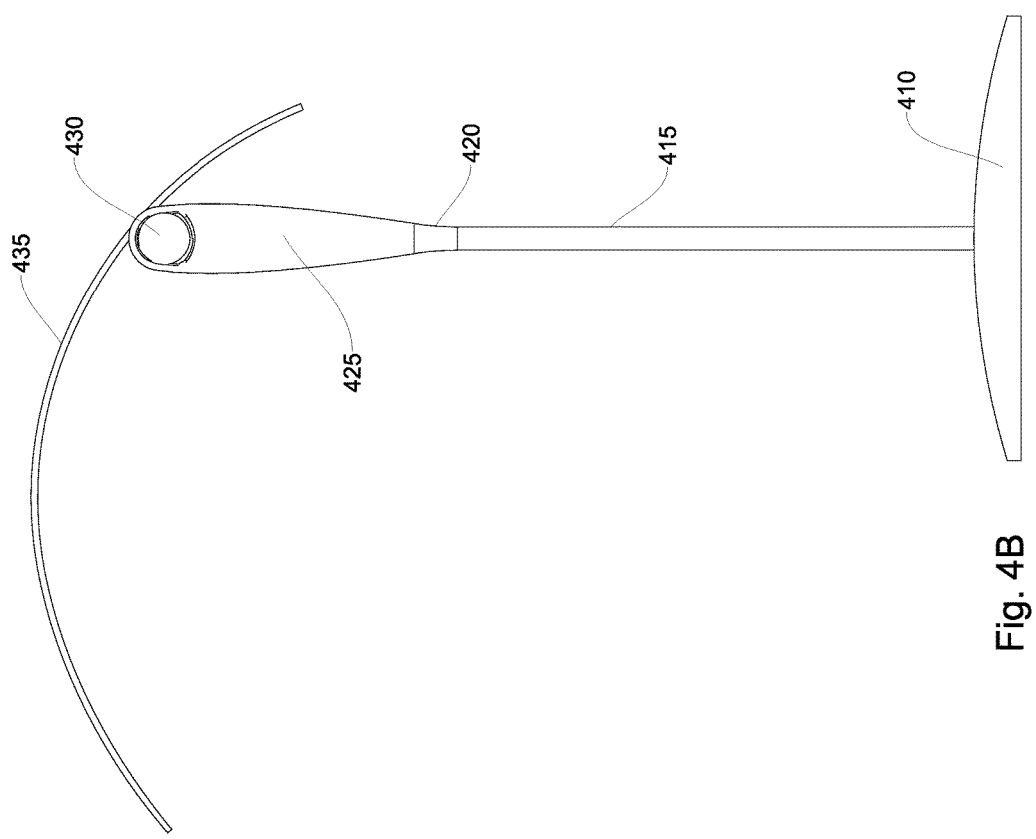
FIG. 4B is a side view of a shading object with a deployed shading element according to an embodiment.

In an example embodiment, a shading object may also include a wind sensor. In an embodiment, a wind sensor may detect 655 that a wind velocity is greater than an acceptable value and send a signal to a controller or processor 429, which in response to signal may instruct, directly or indirectly, a motor 432 and/or pivot assembly 430 to change an orientation of a shading element(s) 440. The change in orientation may be necessary so that an intelligent shading object 400 may not be damaged in high wind conditions and/or injure an individual residing under a shading object. FIG. 4B is a side view of a shading object with a deployed shading element according to an embodiment.

Figure 7A:
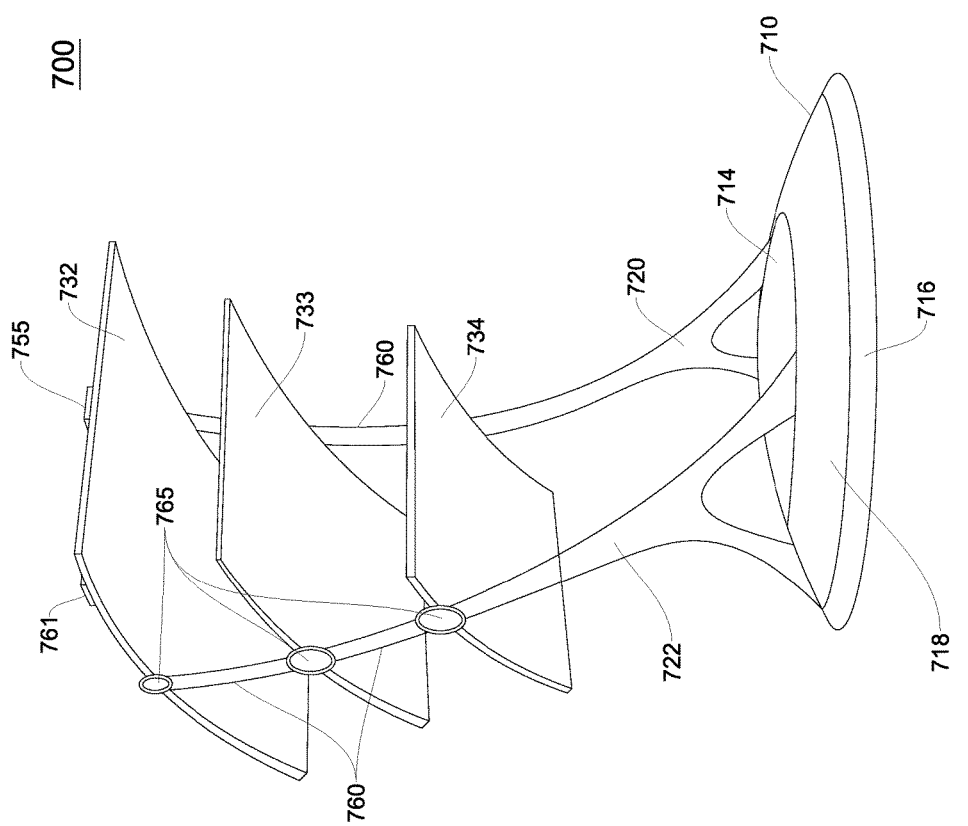
FIG. 7A illustrates a third shading object according to an embodiment.

FIG. 7A illustrates another shading object according to an embodiment. In an embodiment, a shading object 700 may include a base unit 710, one or more support units 720 and 722, a louver system 760, and a plurality of shading elements 732, 733 and 734. In an embodiment, one or more support units 720 and 722 may be connected or coupled to a base unit 710. In embodiments, one or more support units 720 and 722 may be next to each other in a closed position. In a closed position, a plurality of shading elements 732 733 and 734 may be folded or bunched together and may not provide coverage to individuals within a shading area. In an embodiment, If one or more two support units 720 and 722 are moved apart to an open and/or deployed position, a plurality of shading elements 732 733 and 734 may expand to a deployed position and provide coverage to the shading area. In an embodiment, a louver system 760 may allow an orientation of the shading element 732 733 or 734 to be modified (e.g., change a shading element's vertical and/or horizontal orientation).

FIG. 7A illustrates a third shading object according to an embodiment. In an embodiment, a base unit 710 may include one or more weight compartments, a first motor 711, a controller or processor 719, a first rotation unit 712, a second motor 713, and a support deployment unit 714. In an embodiment, a support deployment unit 714 may also referred to as a support structure deployment mechanism. Similarly, in an embodiment, a support or support unit may be referred to as a support structure. In an embodiment, a base unit 710 may also include a light source 717. In embodiments, a base unit 710 may include a first section 716 that does rotate. Continuing with an embodiment, a first section 716 may be circular in shape and may include an outer circumference. In an embodiment, a second section 718 may rotate in response to commands. Illustratively, in embodiments, a second section 718 may be located inside a first section 716 and a second section 718 may be circular in shape. In an embodiment, a first motor 711 may receive signals and/or commands, directly or indirectly, from a controller or processor 719. In an embodiment, a first motor 711 may cause a first rotation unit 712 to rotate in a clockwise or a counterclockwise direction. Continuing with an embodiment, a rotation causes one or more support units 720 and 722 to move in a clockwise and/or counterclockwise direction. For example, in embodiments, a controller or processor may receive a signal from a sunlight sensor 761 identifying a direction of sunlight and/or intensity of sunlight with respect to an orientation of shading elements. In an embodiment, a controller or processor 719 may send a signal and/or commend, directly or indirectly, to a first motor 711 to cause a rotation unit 712 to move a second section 718 and track a direction of sunlight.

In an embodiment, a support deployment unit 714 may cause one or more support units 720 and 722 to move from a rest position (where one or more support units 720 and 722 are in close proximity) to an "in use," open or deployed position. In an embodiment, a second motor 713 may be connected to a support deployment unit 714 and may drive a support deployment unit 714 from the rest to open position or vice-versa. In an embodiment, a controller or processor 719 may provide a signal and/or comment, directly or indirectly, to a second motor 713 to instruct a motor to cause the support deployment to move from a rest position to an open position. Alternatively, in an embodiment, a mechanical assembly, instead of a motor, may be utilized to move a support deployment unit 714 from a rest position to an open position. In the illustrative embodiment of FIG. 7A, support deployment unit 714 is shown in an open position.

In embodiments, one or more support units 720 and 722 may be permanently connected to a base unit 710. Alternatively, in an embodiment, one or more support units 720 and 722 may be detachable from a base unit 710 and may be inserted into support holders in a base unit 710. In embodiments, support units 720 and 722 may include a louver system 760, or be connected and/or coupled to a louvre system.

In an embodiment, a louver system 760 may be activated either mechanically or electrically. If activated mechanically, rope or strings or similar material may allow manual repositioning of shading elements 732 733 and 734. In an embodiment, a louver system 760 may include pivot hinges 765 located in pairs on opposite sides of shading element support frames 720 and 722. As illustrated in FIG. 7A, one or more support units 720 and 722 may have three pivot hinges 765 located at a same height on one or more support units 720 and 722. In an embodiment, pivot hinges 765 may be connected to a driving/deployment/movement unit 766. In an embodiment, a driving unit 766 may be electrical or mechanical. Continuing with an embodiment, a driving unit 766 may be located or integrated into one or more support units 720 and 722. Alternatively, a driving unit 766 may be located or integrated into a base unit 710. If a driving unit is mechanical, a string or rope may connect a driving unit 766 to pivot hinges 765. If a driving unit 766 is electrical, a cable may connect a driving unit 766 to pivot hinges 765. In an embodiment, a shading element may be connected between a pairs of pivot hinges 765. In an embodiment, a driving unit 766 may cause a shading element to rotate in a clockwise or counterclockwise direction about an axis. Continuing with an embodiment, a driving unit 766 may be able to cause individual shading elements to rotate rather than having a number or most of shading elements 732 733 and 734 rotate. Alternatively, in an embodiment, a driving unit 766 may move a plurality of shading elements to move in unison. Illustratively, in FIG. 7A, in an embodiment, a plurality of the shading elements 732 733 and 734 may have moved in unison to a position that is between 90 degrees and 135 degrees counterclockwise from an axis 768. In an embodiment, a front of shading elements 732 733 and 734 are higher than the back of shading elements. In an embodiment, light source, e.g., a sun, may be directly overhead or behind a center of the shading object 800 and thus more of a shading element is provided to provide cover for the shading area.

In an embodiment, a top surface of shading elements 732 733 and 734 may have photo cells 741 disposed thereon. In an embodiment, photocells 741 may capture sunlight and may store energy in a solar energy connection unit 742. In an embodiment, a solar energy connection unit 742 may provide power to any of the power sources or electronic components of a shading object 800. In an embodiment, only a top shading element, e.g., 732, may have photocells 741 disposed thereon. In an embodiment, a shading object 800 may also include a light sensor 761. In embodiments, a light sensor 761 may detect a direction and/or intensity of the sunlight. Continuing with an embodiment, a light sensor 761 may be connected to a controller or processor 719 in a base unit 710. In an embodiment, a light sensor 761 may send a signal, directly or indirectly, to a controller in a base unit 710 instructing a controller or processor 719. In an embodiment, a controller or processor 770 may receive the signal and directly or indirectly cause a first motor 711 to drive a rotation unit 712 and cause one or more support units 720 and 722 (and thus the shading elements 732 733 and 734) to move in a desired clockwise and counterclockwise direction.

In an embodiment, At least one of shading elements 732 733 or 734 may comprise a wind sensor 755. Alternatively, in an embodiment, one of a plurality support units 720 or 722 may comprise a wind sensor 755. In an embodiment, a wind sensor 755 may capture a direction and/or velocity of wind in the environment where a shading object is installed. In embodiments, a wind sensor 755 may be coupled to a controller or processor 719. In an embodiment, a wind sensor 755 may transmits a signal to a controller or processor 719. If a captured velocity is over a threshold value, e.g., 10 miles per hour, a controller or processor 719 may cause shading elements 731 732 or 733 to move to a position that is not impacted by the wind. In embodiments, a controller or processor 719 may transmit a command to a support unit deployment apparatus 714 to cause one or more support units 720 and 722 to move a rest position where the shading elements 731 732 and 733 are folded and not impacted by the wind.

Figure 8:
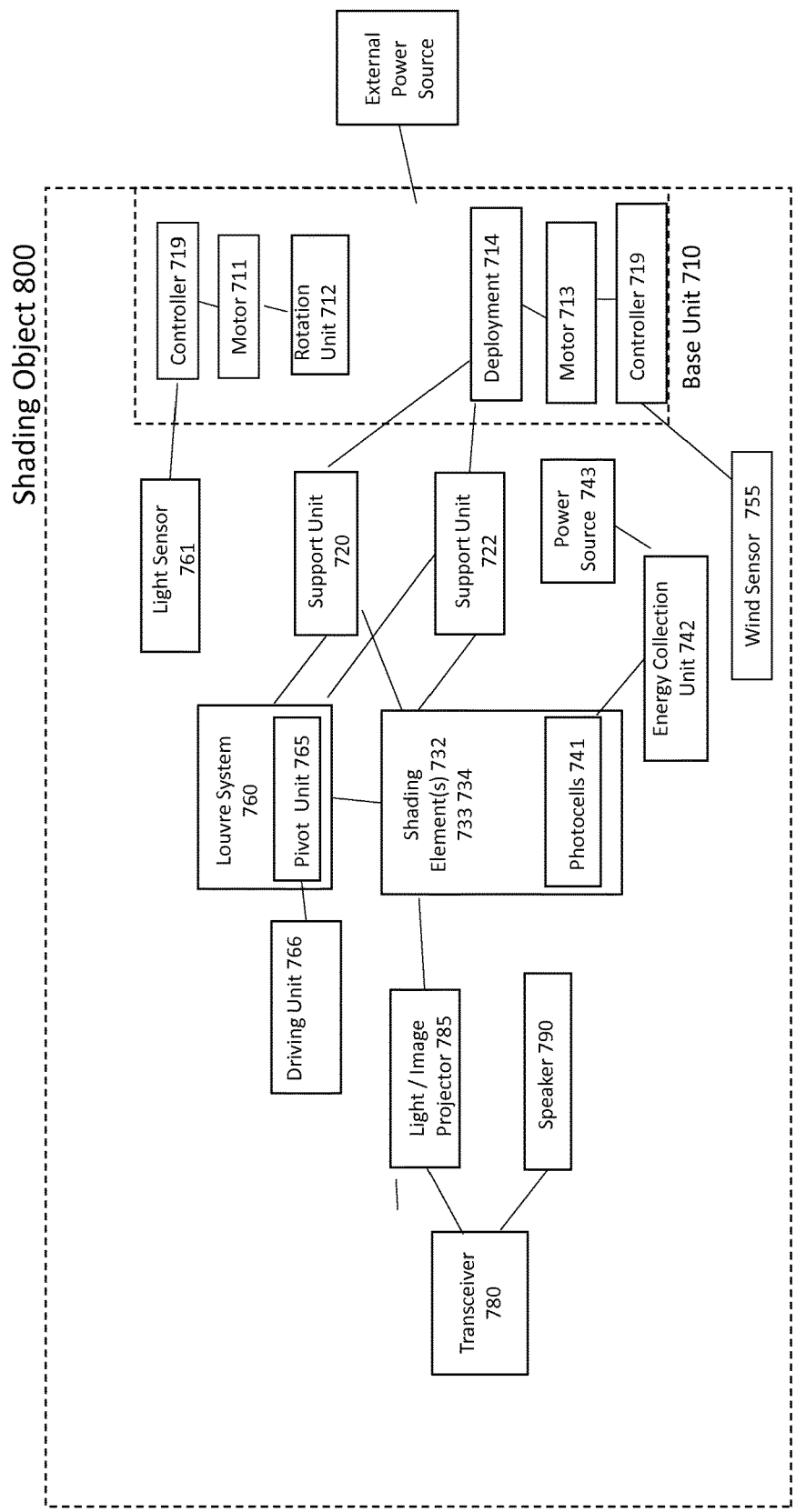
FIG. 8 illustrates a block diagram of a shading object including a louvre system according to an embodiment.

FIG. 8 illustrates a block diagram of a shading object including a louvre system according to an embodiment. In an embodiment, a shading object may also comprise a transceiver 780, a light projector 785, and/or a speaker 790. In an embodiment, a transceiver 780 may receive either signals representing video information and/or signals representing audio information. Continuing with an embodiment, a transceiver 780 may receive these signals via a wired or wireless connection. In an embodiment, a transceiver may receive the video information and may transit the information to a light projector 785, which may project representative video information onto one or more of shading elements 732 733 or 734. In an embodiment, a light projector 785 may transmit light and/or video onto surfaces of one or more shading elements 732 733 or 734. In an embodiment, a transceiver 780 may receive audio information and may transmit received audio information to speakers 790 for playback.

Figure 9:
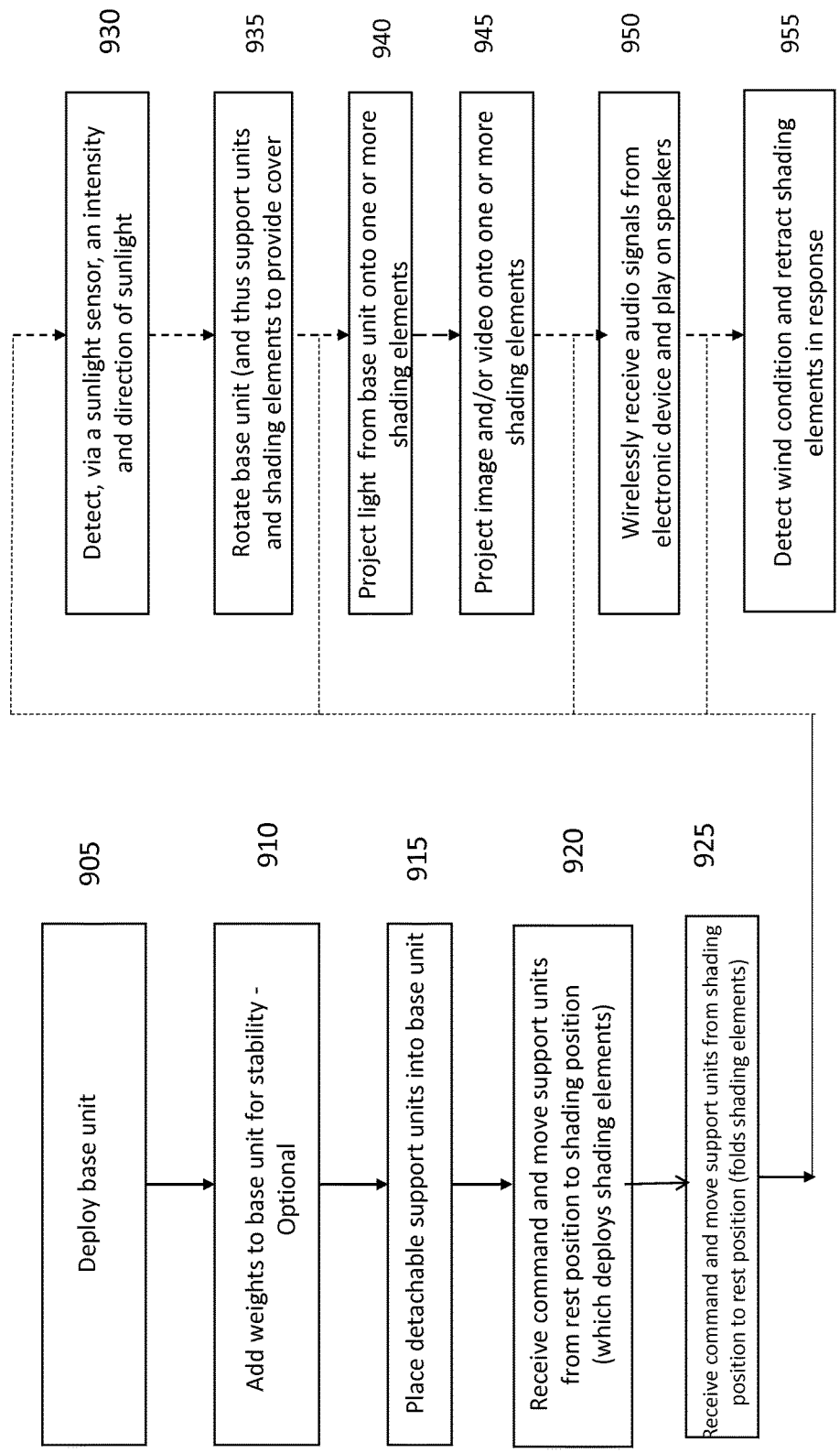
FIG. 9 discloses a method of operation for a third shading object according to an embodiment of the invention.

FIG. 9 discloses a method of operation for a third embodiment of a shading object according to an embodiment. In step 905, a base unit is deployed. In step 910, in embodiments, a base unit may have weights added into compartments of a base unit. In step 915, in an embodiment, detachable support units are placed into holders in the base unit. In step 920, in an embodiment, a controller or processor may receive a command and one or more support units may move from a rest position to a shading or deployed position. In step 925, in embodiments, a controller or processor may receive a command and move support units from a shading position to a rest position.

In embodiments, in step 930, a sunlight sensor may detect an intensity and/or direction of sunlight. In step 935, a controller or processor may receive the signal from a sunlight sensor and may send a signal and/or commands directly, or indirectly, to rotate a base unit (and thus support units and shading elements) in a clockwise (or counterclockwise) direction to provide shade from a light source (e.g., the sun). In embodiments, in step 940, a light projector may project light onto a surface of one or more shading elements. In embodiments, in step 945, a projector may project an image and/or video onto one or more shading elements. In embodiments, in step 950, an audio system may receive, via wireless communications, an audio signal from an electronic device and transmit an audio signal to speakers for playing in and around the shading object. In embodiments, in step 955, a wind sensor detects wind conditions and if the conditions are greater than a wind threshold, then shading elements (and support units) may be moved to a rest position from a shading position. FIG. 7B illustrates a side view of a third shading object according to an embodiment.

Figure 10A:
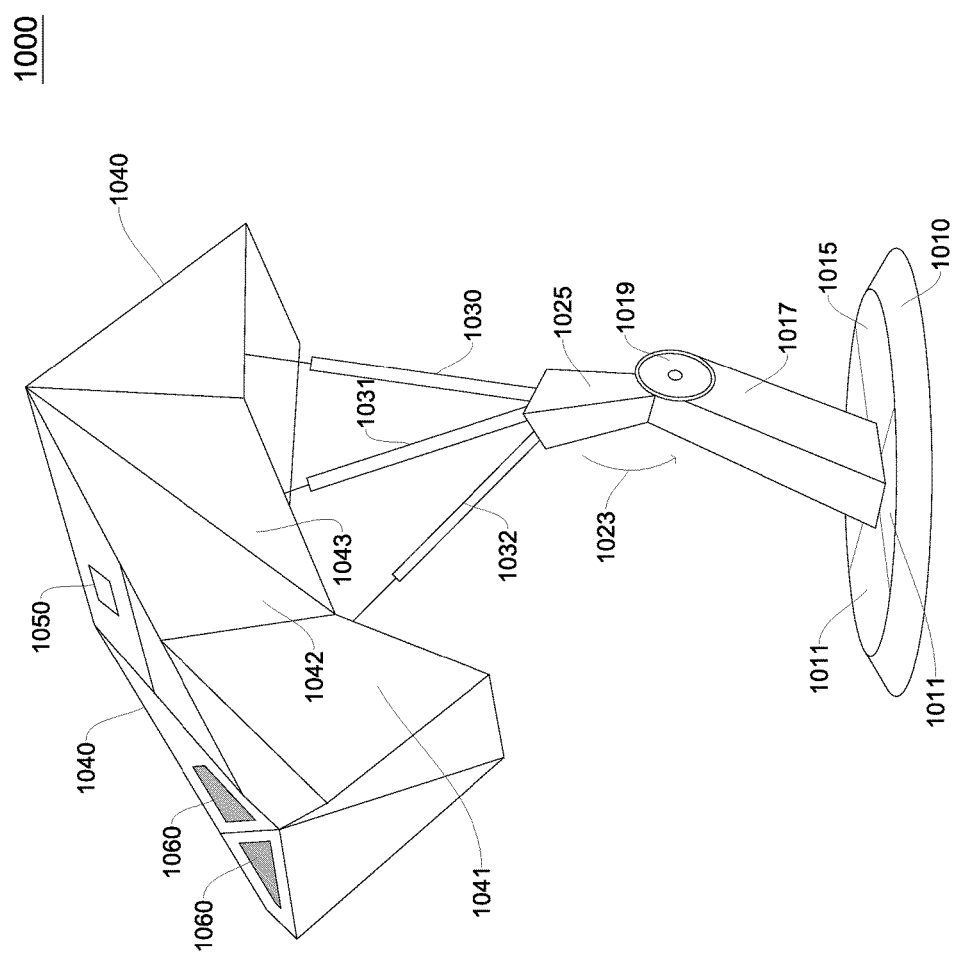
FIG. 10A illustrates a fourth shading object according to an embodiment.

FIG. 10A illustrates a fourth embodiment of an intelligent shading object. In an embodiment, shading object 1000 may comprise a base unit 1010, a support unit 1017, a telescope support housing 1025, a plurality of telescoping rods 1030 1031 1032, and/or a shading element 1040. In an embodiment, an intelligent shading object may also include at least one photo cell 1060 and/or a light sensor 1050.

In an embodiment, a base unit 1010 may include weight compartments 1011 for housing weights to provide additional support to a base unit 1010, when a shading element 1040 is deployed. In an embodiment, weights may be removable and may fit into weight compartments. In an embodiment, a base unit 1010 may also include a rotation unit 1015. In an embodiment, a rotation unit 1015 may be circular in shape and may be located in an interior surface of the base unit 1010, as illustrated in FIG. 10A.

In an embodiment, a support unit 1017 may be connected or coupled to a base unit 1010. In embodiments, a support unit 1017 may be connected to a rotation unit 1015 of a base unit. In an embodiment, a rotation unit 1015 may be configured to allow a support unit 1017 to rotate in a clockwise or counterclockwise direction to, for example, follow a light source, e.g., the sun, or to respond to a user's voice or digital command. In embodiments, a support unit 1017 may comprise be coupled to a first pivot hub (not shown) and a second pivot hub 1019. In an embodiment, a first pivot hub may be configured to allow a support unit 1017 to move in a vertical direction and, illustratively, fold against a top surface of a base unit 1010. This allows for easier storage and/or transport of a shading object 1000. In an embodiment, a telescoping support housing 1025 may be coupled or connected to a support unit 1017. In embodiments, a telescoping support housing 1025 may be connected to a support housing 1017 via a second pivot hub 1019. Illustratively, in an embodiment, a second pivot hub 1019 may be configured such that a telescoping support housing 1025 may rotate in a clockwise or counterclockwise direction in order to move from a rest or non-use position to a deployed to "in use" position, as is illustrated by reference arrow 1023 in FIG. 10A. In embodiments, a telescoping support housing 1025 may rotate about the second pivot hub 1019 to lie flat against a side of a support unit 1017 or inside a compartment of a support unit 1017. This may allow a support unit 1017 and telescoping support housing 1025 to have a smaller footprint for easier storage and/or portability.

In embodiments, a telescoping support housing 1025 comprises a deployment mechanism 1027, a rod storage area 1028, and/or a plurality of telescoping rods 1030 1031 and 1032. In embodiments, in a rest position, a plurality of telescoping rods 1030 1031 and 1032 are stored in the rod storage area 1028. Illustratively, in an embodiment, after a controller or processor in telescoping support housing 1025 receives a command to deploy a plurality of telescoping rods 1030 1031 and/or 1032 (and thus the shading element 1040), a controller or processor may provide commands, and/or signals directly, or indirectly, to a deployment mechanism 1027. In an embodiment, a deployment mechanism may deploy or push to an extended position, a plurality of telescoping rods 1030 1031 and/or 1032. In an embodiment, a plurality of telescoping rods 1030 1031 and/or 1032 may exit the telescoping support housing 1025 via a top surface. In embodiments, telescoping support rods 1030 1031 and/or 1032 may support a shading element 1040 in its deployment. After receiving another command, telescoping support housing 1025 may retract a plurality of telescoping rods 1030 1031 and/or 1032, which causes a shading element 1040 to move to a folded position. In embodiments, a telescoping support housing 1025 may also include a storage area 1029 for a shading element 1040. In embodiments, after telescoping rods 1030 1031 and/or 1032 have been retracted, a shading element 1040 may be removed from ends of the plurality of telescoping rods 1030 1031 and/or 1032 and placed in a storage area 1028 or another storage area. In other embodiments, a storage area 1028 may be located in a base unit 1010, a support unit 1017 and/or a telescoping support housing 1025.

In an embodiment, a shading element 1040 (or shading elements) may be shaped like an origami. In embodiments, a shading element 1040 (or shading elements) may have sections 1041 1042 and/or 1043 that take many shapes, dependent on a number of panels in a shading element 1040 (or shading elements) and a number of telescoping rods 1030 1031 and/or 1032 that are supporting a shading element 1040 (or shading elements). In an embodiment illustrated in FIG. 10A, shading element section 1041 may have a trapezoidal shape and shading elements sections 1042 and/or 1043 may have a triangular shape. In an embodiment, shapes of shading element sections 1041 1042 and/or 1043 may be determined based on a shading area to be covered by a shading element 1040 (or shading elements). Ends of telescoping rods 1030 1031 and/or 1032 may be coupled or connected by fasteners to a surface of a shading element (e.g., such as an underside of the shading element) or shading elements. In an embodiment, a shading element 1040 (or shading elements) may include a fabric membrane and a plurality of parts placed or located within the fabric membrane. In embodiments of the invention, parts may be inserted into pockets of a fabric membrane. Membrane parts may be made of a stiff material. In embodiments, parts may be triangular or trapezoidal in shape. In an embodiment, Membrane parts, when deployed as a shading element 1040, may form a structure with a top surface and a number of side surfaces. In an embodiment, a top surface of the shading element 1040 may include photocells 1060. In an embodiment, multiple top surfaces of a shading element 1040 may include photocells 1060. In an embodiment, a top surface or other surfaces of a shading element (or shading elements) may include a wind sensor 1070. In an embodiment, a top surface of the shading element 1050 (or shading elements) may include a sunlight sensor 1050. FIG. 10B is a side view of a fourth shading object according to an embodiment. In an embodiment, sections 1041 1042 1043 of shading element 1040 may be independently addressed and therefor moved independently. This allows the shading object to be easily modifiable based on the shading area. In an embodiment, a deployment mechanism may deploy the rods 1030 1031 and/or 1032 at different lengths to provide a differently shaped shading element with various orientations of the shading sections 1041 1042 and/or 1043. In addition, additional embodiments may include more rods projecting from the telescoping rod support area 1025.

Figure 11:
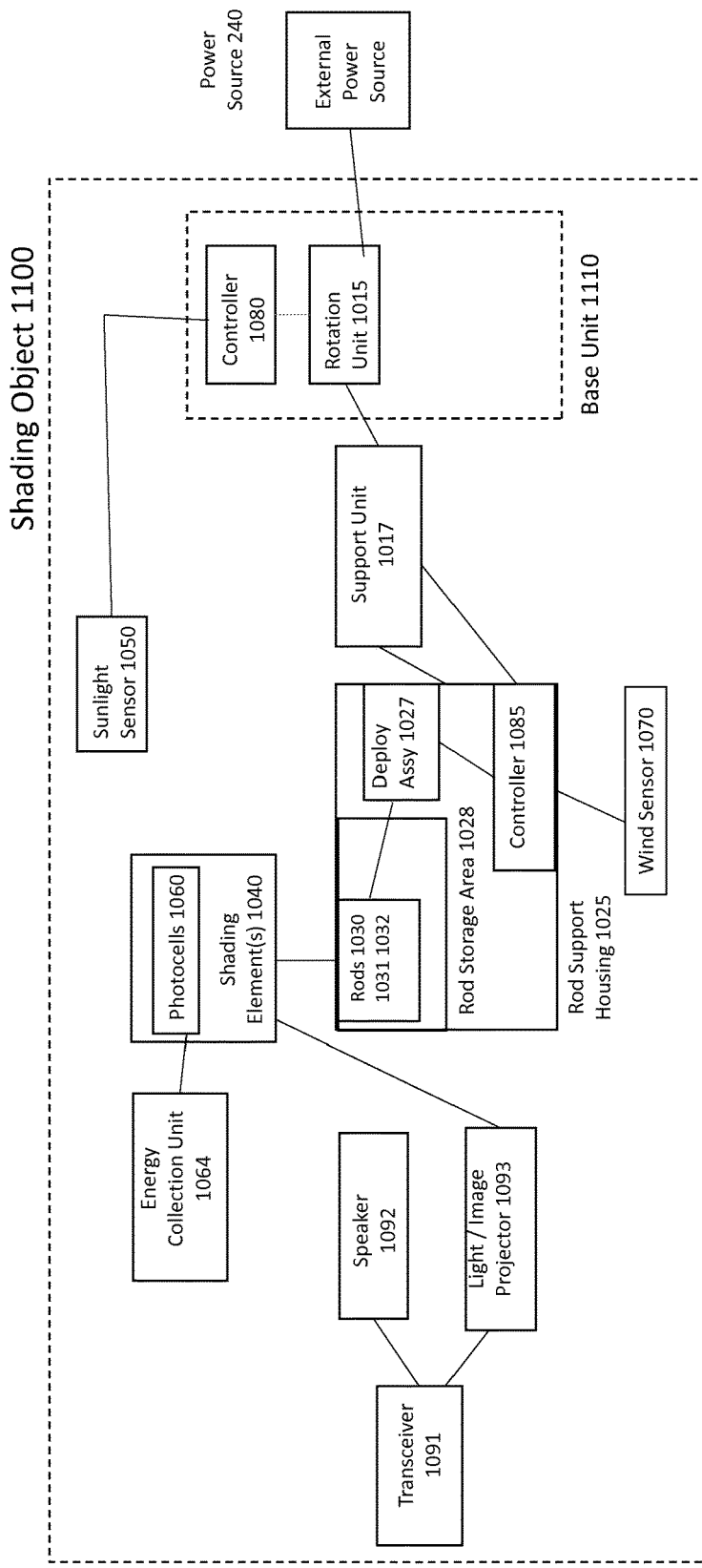
FIG. 11 is a block diagram of a fourth shading object according to an embodiment.

FIG. 11 is a block diagram of a fourth shading object according to an embodiment. In an embodiment, a sunlight sensor 1050 may measure an intensity of sunlight and may transmit a signal to a controller or processor 1080 in a base unit 1010. In an embodiment, controller or processor 1080 may analyze the received signal and instruct, directly or indirectly, a rotation unit 1015 to move a support unit 1017 in a clockwise or counterclockwise direction to follow a path of a light source (e.g., the sun). In an embodiment, a wind sensor 1070 may measure an intensity or velocity of wind in an environment around the shading object. In an embodiment, a wind sensor 1070 may transit a signal to a controller or processor 1085 which may be resident in a support unit 1017 and/or rod support housing 1025. In an embodiment, controller or processor 1085 may analyze a transmitted signal and may identify that a value representing the wind speed is higher than a predetermined or existing threshold. In an embodiment, If a value representing a wind speed is higher than a threshold, a controller or processor 1085 may send a signal and/or commends to a deployment assembly 1027 to park or retract support rods 1030 1031 and/or 1032 and thus, a shading element 1040 (or shading elements). In addition, a controller or processor 1085 may transmit a signal or transmit commands directly, or indirectly, to a pivot hinge or assembly 1019 to rotate a deployment housing 1025 in a direction that allows a surface of a deployment housing to rest against a support unit 1017.

In an embodiment, a top surface of a shading element 1040 (or shading elements) may have photo cells 1060 disposed thereon. In an embodiment, photocells 1060 may capture sunlight and may store energy in a solar energy connection unit 1064. The solar energy connection unit 1064 may provide power to any power sources or electronic components of a shading object 1100. In an embodiment, only a top shading element, e.g., 1040, may have photocells 1060 disposed thereon.

In an embodiment, a shading object may also comprise a transceiver 1091, a light projector 1093, and/or a speaker 1092. In an embodiment, a transceiver 1091 may receive either signals representing video information and/or signals representing audio information. Continuing with an embodiment, a transceiver 1091 may receive these signals via a wired or wireless connection. In an embodiment, a transceiver may receive the video information and may transit the information to the light projector 1093, which may project the information onto one or more of the shading element(s) 1040. In an embodiment, a light projector 1093 may transmit light onto surfaces of one or more of the shading element(s)

1040. In an embodiment, a transceiver 1091 may receive audio information and may transmit the received audio information to speakers 1092 for playback.

Figure 12:
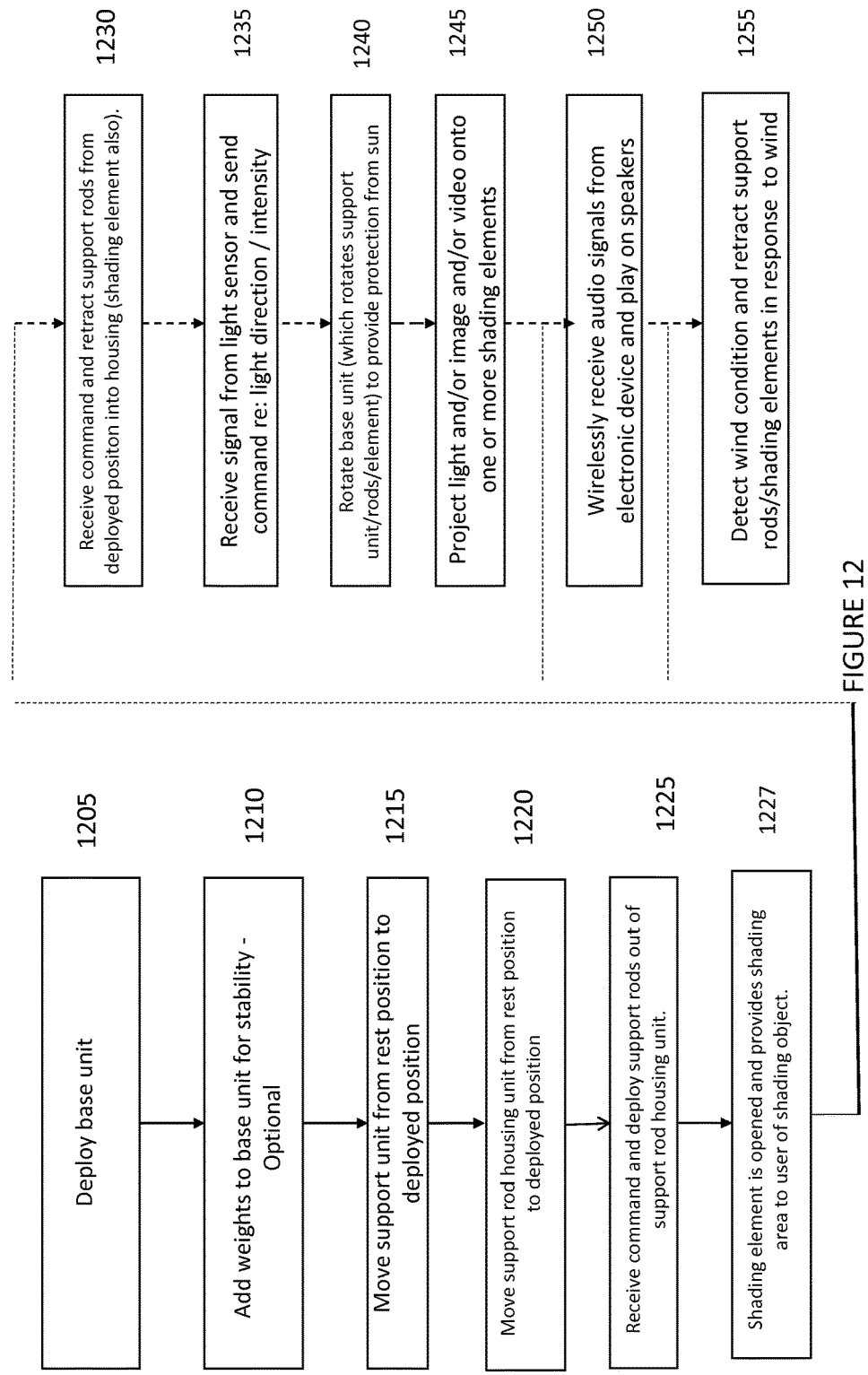
FIG. 12 illustrates a method of operating a fourth shading object according to an embodiment.

FIG. 12 illustrates a method of operating a shading element according to an embodiment. At step 1205, in embodiments, a base unit is deployed. In embodiments, at step 1210, weights are added to a base unit for stability. At step 1215, in embodiments, a command may be received, and a motor moves a support unit from a rest position to a deployed position. At step 1220, in embodiments, a command may be received, and a motor moves a support rod housing unit from a rest position to a deployed position. At step 1225, in embodiments, a command may be received and a support rod deployment apparatus may deploy a support rod out of a top side of the support rod housing to a deployed position. At step 1227, in embodiments, deployment of the support rods causes a shading element to be opened or placed in a position to provide shade to a user of the shading object. At step 1230, in embodiments, a command may be received and support rods may be retracted into the support unit housing 1025, which causes a shading element to fold into a close position.

Figure 13:
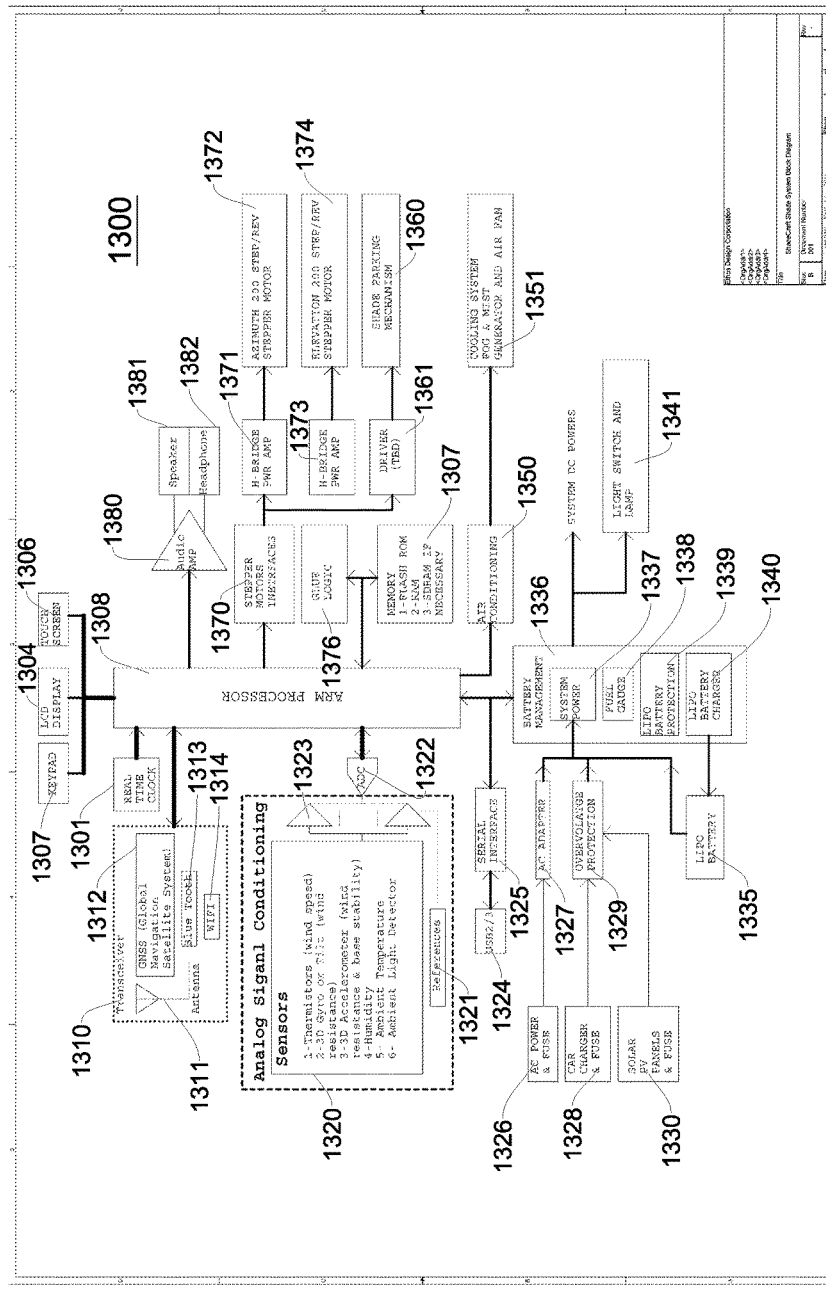
FIG. 13 is a block diagram of a block diagram of multiple components within a shading object.

At step 1235, in embodiments, a shading object controller may receive a signal from a light sensor indicating intensity and direction of sunlight. At step 1240, in embodiments, a command is sent to the motor and a base unit rotates (which rotates the support unit, the support rod housing unit, and a shading element in a direction that provide shade from a sun or environment. At step 1245, in embodiments, a controller or processor, may receive a command, and light may be projected onto a surface of a shading element. Alternatively, or in addition to, images and videos may be projected onto a surface of a shading element. At step 1250, in embodiments, wirelessly received audio signals may be received from an electronic device and may be played on speakers. At step 1255, in embodiments, wind may be detected by a wind sensor, and a wind sensor may transmit a signal to a controller or processor and a controller or processor may directly, or indirectly, transmit a signal to cause retraction of support rods/shading elements in response to wind FIG. 13 is a block diagram of a block diagram of multiple components within a shading object. The shade object system 1300 includes user interfaces such as a keypad 1302, a display 1304 (e.g., such as a LCD display), and/or a touchscreen 1306. In an embodiment, user interfaces may be part of a control panel which may be used to input instructions to an intelligent shading object. For example, a user could use the touchscreen to enter instructions or commands to cause a shading object to open or deploy shading elements, play music, project light onto surfaces, adjust shading elements to move shading area, provide misting and/or fog in shading area, and other similar actions. In an embodiment, a touchscreen may be on a computing device (e.g., which may be personal computer, a laptop, a network computer, a tablet, and/or a smart phone). In an embodiment, a control panel (including one or more of the keypad 1302, display 1304, and touchscreen 1306) may be mounted to a support frame of the shading object or may be integrated into a remove control device that communicates with controllers or processors in an intelligent shading object 1300 via wireless or wired communication protocol.

In an embodiment, as illustrated in FIG. 13, a shading object system 1300 may include a processor 1308, a clock 1301, a memory subsystem 1307, and/or glue logic 1376. Glue logic 1376 may allow different components within an intelligent shading object system to interface with each other. For example, glue logic 1376 may allow a processor 1308, a memory subsystem 1307 and/or a clock 1301 to interface with one another. In an embodiment, a processor 1308 interfaces with many components of an intelligent shading object 1300. As a non-limiting example, a processor 1308 may directly, or indirectly, interface with a touch screen 1306, a display 1304, the keypad 1302, an audio amplifier 1380, a stepper motor interfaces 1370, and a transceiver 1310 for receiving Global Navigation Satellite Systems, Blue Tooth and WiFi signals, a battery management system 1336, as well as many other components.

In an embodiment, a memory subsystem 1307 may comprise memory such as FLASH ROM, RAM, and/or SDRAM. In an embodiment, FLASH ROM and/or SDRAM may be utilized to store software and instructions, which when executable by a processor or processors 1308 and/or controllers, may cause an intelligent shading object system to perform operations and receive and/or transmit information. In an embodiment, FLASH ROM may be updated with new software and/or instructions. In an embodiment, RAM or SDRAM of a memory subsystem 1037 may be utilized as memory that is used by a processor 1308 to execute programs and perform software operations. In an embodiment, a clock 1301 may provide a timing reference for a processor 1308.

In an embodiment, a shading object system 1300 may also comprise a transceiver 1310 for receiving information from outside systems such as Global Positioning Satellites, Bluetooth-enabled computing devices, and/or WiFi-enabled computing devices. In an embodiment, a transceiver 1310 may comprise an antenna 1311, a Bluetooth transceiver 1313, a GNSS transceiver 1312, and/or a WiFi transceiver 1314. In an embodiment, a GNSS transceiver 1312 may utilize the antenna 1311 to receive GPS signals from GPS satellites and gather positioning information for an intelligent shading object system 1300. In an embodiment, positioning information may allow an intelligent shading object system to receive weather (e.g., temperature, humidity, wind) information, and/or predict environmental information by receiving predictions from an almanac and/or other weather forecasting system. In an embodiment, positioning information may also allow a subsystem to understand potential intensity and strength of sun in the location where an intelligent shading object resides. For example, if a positioning information indicates the shading object system 1300 is located in a Mojave Desert in California, then positioning information lets a shading object system may know an intensity of a sun is higher in a Mojave Desert than in a northern portion of Alaska.

In an embodiment, a Bluetooth transceiver 1313 may utilize an antenna 1311 to receive and/or transmit signals and/or information to other Bluetooth-enabled devices. For example, in an embodiment, a user may utilize a mobile phone with Bluetooth capabilities to control operation of an intelligent shading object system and/or to stream audio and/or video to an intelligent shading object system 1300 for playing via speakers 1381 and/or headphones 1382 (after passing through a processor or controller 1308 and an audio amplifier 1380). In addition, in an embodiment, a WiFi transceiver 1314 may utilize an antenna 1311 to receive and/or transmit signals and/or information to other electronic devices having WiFi capabilities. For example, a user may utilize a mobile phone with WiFi capabilities to control operation of a shading object system and/or to stream audio and/or video to an intelligent shading object system 1300 for playing via speakers 1381 and/or headphones 1382. In addition, a WiFi transceiver 1314 and/or Bluetooth transceiver 1313 may be utilized to communicate with a light or video projector (not shown) (e.g., transmit video and/or audio signals to the projection device) which may project video and/or light onto a plurality of shading elements of a shading subsystem 1300. Communications with a speaker 1381 and/or headphones 1382 and/or projector may occur after a transceiver 1310 has sent signals through a processor/controller 1308, and/or an amplifier 1380 (for audio signals).

In an embodiment, an intelligent shading object system 1300 may also include a power subsystem. In an embodiment, a power subsystem may include an AC power adapter 1327, DC power devices 1328 (e.g., car chargers), solar photovoltaic panels 1330, a rechargeable battery 1335 (such as a Lithium-Polymer Rechargeable Battery (LIPO)), and a battery management system 1336. In an embodiment, an AC power adapter 1327 may receive power from an AC power source 1326, which may also include a fuse. In an embodiment, an AC power adapter may provide power to a system power supply 1337 and/or battery 1335. Similarly, in an embodiment, a DC charger 1328 (which may include a fuse), may provide voltage and/or current to a system power supply 1337 and/or a rechargeable battery 1335. In an embodiment, an overvoltage protection circuit 1329 may protect a system power supply 1337 and/or a battery 1335 from overvoltage spikes in providing of voltage and current to other components in an intelligent shading object system.

In an embodiment, solar photovoltaic panels 1330 may provide voltage and current to a system power supply 1337 and/or a rechargeable battery 1337. In an illustrative embodiment, solar photovoltaic panels 1330 may be coupled to an overvoltage protection module 1329 to protect a shading object system from overvoltage conditions. In addition, in an embodiment, solar photovoltaic panels 1330 may be coupled or connected to a power storage system before transferring voltage to a system power supply 1337 and/or a rechargeable battery 1135. In an embodiment, a battery management subsystem 1336 may provide DC power to a shading object system 1300. A battery management subsystem 1336 may include a fuel gauge module 1337 to identify how much power is in a shading object system 1300. This information may be provided to a processor 1308 and then displayed on a LCD display 1304 and/or touch screen 1306. In an illustrative embodiment, a battery management system 1336 may also include a battery protection circuit 1339 to protect the battery from overvoltage, overcurrent, undervoltage and/or undercurrent conditions. In an embodiment, a battery management system 1336 may also include a battery charger 1340, which may recharge a battery 1335. In an illustrative embodiment, an AC adapter 1327 may provide voltage and current to a system power supply 1337. In an embodiment, a system power supply 1337 may provide voltage and current to the components of the shading object system 1300. In addition, a system power supply 1337 may provide voltage and current to a battery charger 1340, which in turn may provide power to a rechargeable battery 1335.

In an embodiment, a shading object system may also include a communications interface. The communications interface may include a USB 2.0 or 3.0 device 1324 and a USB or other serial interface module 1325. In an illustrative embodiment, a USC 2.0 or 3.0 device 1324 and/or the serial interface module 1325 may communicate with a processor 1308 and/or a battery management subsystem 1336.

In an embodiment, an intelligent shading object system may also include an analog signal conditioning subsystem. In an embodiment, an intelligent shading object system (and the analog signal conditioning system) may include a plurality of sensors 1320, reference signal modules 1321, signal conditioning modules 1323 and an analog-to-digital converter 1322. In an embodiment, sensors 1320 may receive analog signals and transmit the analog signals to signal conditioning modules 1323 that are received and processed or conditioned by a signal conditioning modules 1323. In an embodiment, signals may be transmitted and/or transferred by signal conditioning modules 1323 and then transferred to an A-to-D converter 1322. In an embodiment, a signal reference module 1321 may be a non-volatile memory that stores signal values that the received signal values may be compared to in order to determine if threshold conditions are met. In an embodiment, this may allow the shading object subsystem to understand if normal conditions are being experienced, or if an intelligent shading object subsystem is in abnormal conditions, (e.g., high humidity, high movement, high wind, etc.)

In an embodiment, a plurality of sensors may also include a thermistor (for measuring wind speed in the shading object environment), a 3D gyro or tilt sensor (for measuring wind resistance in the shading object environment), a 3D accelerometer sensor (for measuring wind resistance and base stability), a humidity sensor (for measuring humidity in the shading object environment), a temperature sensor (for measuring temperature in the shading object environment), and/or a light sensor (for measuring sun intensity and/or sun intensity direction).

In an embodiment, an intelligent shading object system 1300 may be monitoring wind and other potentially dangerous weather conditions on a periodic, continuous, or as directed basis. In an embodiment, a thermistor, 3D gyro or tilt sensor, and/or 3D accelerometer sensor may receive readings and generate signals indicating an environment including wind conditions where an intelligent shading object resides. In an embodiment, wind condition and other stability measurements received via sensors may be conditioned by a signal conditioning module 1323, compared to reference signals supplied by signal reference module 1321, converted to digital signals by a A-to-D converter 1322 and transferred to a controller or processor 1308. In an embodiment, a processor or controller 1308 may analyze the received wind condition or other measurements and may determine that a dangerous or out-of-tolerance condition is occurring. In an embodiment, a processor 1308 may then transmit a signal to a stepper motor interface module 1370 indicating that a shading object system should be placed in a rest or closed position (e.g., in a position where shading elements are not deployed). In an embodiment, a stepper motor interface module 1370 may transmit a signal, command, and/or instructions to a shade parking mechanism module 1351. In an embodiment, a shade parking mechanism 1351 may cause the shading elements and/or other components of an intelligent shading system to be placed in a closed or rest position where the stability of the shading system is not an issue.

In an embodiment, a processor 1308 may instead determine that one or more shading elements may be moved in a specific direction and/or placed in a specific orientation so as to avoid a dangerous or out-of-tolerance condition. In an illustrative embodiment, a processor 1308 may transmit a signal, command, and/or provide instructions to a stepper motor interface 1370, which may communicate with a power amplifier 1371, which may transmit a signal to an azimuth stepper motor 1372. In an illustrative embodiment, an azimuth stepper motor 1372 may move a shading object system in a horizontal manner (in this case to move shading elements (or other components of a shading object system) away from a dangerous or out-of-tolerance weather condition).

In an embodiment, a shading object system may also include an additional controller and/or an additional motor. In an embodiment, "processor" and "controller" may be used interchangeably. In an embodiment, a motor may be a stepper motor and a controller may interface with a stepper motor through a stepper motor interface. In an embodiment, an additional motor may expand and/or contract fabric and/or material on a shading element frame. In an embodiment, a shading element frame may comprise tubes, rods, cross-elements, to which material may be attached. In an embodiment, an additional controller (or an existing controller) may transmit a signal or commands to a stepper motor interface, which may transmit a signal to a stepper motor to expand and/or project tubes and/or rods, where the tubes and/or rods may have fabric and/or material attached. In an embodiment, this may cause fabric and/or material to expand or open on a shading element frame and provide shading to an individual. In an embodiment, an additional controller (or an existing controller) may transmit a signal and/or commands to a stepper motor interface, which may transmit a signal to a stepper motor to contract and/or withdraw tubes, rods, and/or frame elements. In an embodiment, contracting and/or withdrawing the tubes, rods, and/or frame elements may cause material to fold or close and go to a position where a shading object is not providing shade to an individual.

In an embodiment, a humidity sensor and/or a temperature sensor of a plurality of sensors 1320 may generate signals indicative of humidity and/or temperature readings in an environment in which a shading system is installed and/or located. In an embodiment, a signal having a values indicative of the temperature and humidity may be conditioned by a signal conditioning module 1323, compared to reference signals from a reference module 1321, converted to a digital signal by the A-to-D converter 1322 and transferred to a processor and/or controller 1308. In an embodiment, a processor or controller 1308 may analyze received temperature and/or humidity signals and/or readings, and determine whether to turn on a cooling and fog system 1351. In an embodiment, a controller or processor 1308 may transmit a signal to a cooling logic module/air conditioning 1350 regarding received temperature and/or humidity signals. In an embodiment, a cooling module 1350 transmits signals, commands, and/or instructions which may cause a cooling and misting system 1351 to turn on and provide fog and/or mist in an intelligent shading object. In an embodiment, a cooling and misting system 1351 may also include a fan. In an embodiment, a controller 1308 and/or cooling logic 1307 may determine the intensity and duration of the misting or fogging in the environment.

In an embodiment, a light sensor of the plurality of sensors 1320 may generate signals indicative of light intensity and/or direction readings in an environment in which an intelligent shading object system is installed. In an embodiment, a signal having a values indicative of the light intensity and direction may be conditioned by a signal conditioning module 1323, compared to reference signals from a reference module 1321, converted to a digital signal by the A-to-D converter 1322 and/or transferred to the controller 1308. In an embodiment, a controller 1308 may analyze a received light intensity and/or direction signals and readings, and determine whether to move an intelligent shading system (and/or shading elements) in a vertical or horizontal direction. If an intelligent shading system (and/or shading elements) are moved in a horizontal direction, signals and/or instructions may be sent from stepper motor interfaces 1370 to power amplifier 1371 and to azimuth stepper motor 1372. In an embodiment, an azimuth stepper motor 1372 may interface with shading element support frames, support systems, pivot assemblies, and or a base unit to move a shading element system 1300 (and/or the shading element(s)) in a horizontal direction. This may allow the shading system to move and track the direction of the sun and sunlight.

In an embodiment, a light sensor of a plurality of sensors 1320 may generate signals indicative of light intensity and direction readings in the environment in which the shading system is installed. In an embodiment, a signal having a values indicative of the light intensity and direction may be conditioned by the signal conditioning module 1323, compared to reference signals from a reference module 1321, converted to a digital signal by the A-to-D converter 1322 and/or transferred to the controller 1308. In an embodiment, a processor or controller 1308 may analyze the received light intensity and direction signals and readings and determine whether to move an intelligent shading system (and/or shading elements) in a vertical or horizontal direction. If an intelligent shading system (and/or shading elements) are to be moved in a vertical direction, signals or instructions may be sent to a stepper motor interfaces 1370 to power amplifier 1373 and then to elevation stepper motor 1374. In an embodiment, an azimuth stepper motor 1374 may interface shading element support frames, support systems, pivot assemblies, and or a base unit to move the shading element system 1300 (and/or the shading element(s)) in a vertical direction. This may allow an intelligent shading object system to move and track a direction of a light source (e.g., a sun and sunlight). This may also allow a user to move the shading system up or down to a desired height in a shading object environment.

In an embodiment, as described supra, an intelligent shading object may track sunlight or sun and/or be able to determine a highest intensity of sunlight via a variety of techniques or procedures. In an embodiment, a portion of a shading object may include a light sensor installed thereon, adjacent to, or within. In an embodiment, a portion of an intelligent shading object may be a shading element, a support unit, and/or a shading object base assembly. In an embodiment, a light sensor, and a structure on which the light sensor is installed and/or resides, may rotate in a circular motion about a central axis. In an embodiment, a light sensor may track sunlight. In an embodiment, a light sensor may perform a 360 degree sweep for an environment. Continuing with an illustrative embodiment, a light sensor, in conjunction with a controller and/or a memory, may register intensities on points on a horizontal axis. In an embodiment, a light sensor may be collecting light intensities at hundreds of locations during a 360 degree sweep. In an embodiment, a light sensor, in conjunction with a controller, may determine or identify a highest intensity on horizontal axis and store a point or location corresponding to a highest intensity.

In an embodiment, a light sensor may move in a vertical direction from a surface on which a light sensor on shading object rests to a top point for on which a light sensor may rest. This may be referred to as performing a vertical sweep of an environment. In an embodiment, a light sensor, in conjunction with a controller and/or a memory, may register light intensities at a number of vertical points (e.g., hundreds or thousands of locations). In this embodiment, a light sensor may determine or identify a highest intensity on a vertical axis and store a measurement corresponding to a vertical location of highest intensity.

In an embodiment, a shading element of the shading object (or another portion of a shading object) may return to a vertical position corresponding to a highest light intensity. In an embodiment, a shading element (or another portion of a shading object) may move in horizontal increments until a horizontal position is reached that measured a highest light intensity. In an embodiment, a shading element of an intelligent shading object (or another section and/or component of a shading object) may move in horizontal increments following a movement of a light source (e.g., a sun), and/or a movement of an earth. In an embodiment, a sensor may cause a shading element of a shading object to track a movement of Earth as it rotates.

In an embodiment, a two-axis sun tracking controller may generate commands to place shading elements and/or other sections of shading objects at an elevation axis value where a photovoltaic sensor receives enough sunlight (e.g., an initial threshold value). In an embodiment, a two-axis sun tracking controller may generate commands to position a shading object and/or shading element at approximately a 45° angle so a photo voltaic sensor may receive enough sunlight.

In an embodiment, a processor or controller may issue commands and/or transmit signals directly or indirectly to a motor and a motor may move a shading object and/or shading element to complete a sweep (e.g., 360 degree sweep) of an azimuth axis. In an embodiment, a shading object and/or a shading element may rotate 360 degrees around a vertical support unit of an intelligent shading object.

In an embodiment, an analog to digital converter (ADC) may be coupled and/or connected to a photo voltaic sensor and/or a controller or processor. As an intelligent shading object and/or shading element sweeps an azimuth axis, an ADC may capture or receive a plurality of samples from a photovoltaic sensor in specified timeframes during a sweep around an azimuth axis. In an illustrative example, an ADC converter may capture or receive hundreds and/or thousands of samples from a photo voltaic sensor per second and may also capture a location of a photovoltaic sensor, a shading element, and/or a shading object. In an embodiment, a plurality of samples may be captured during a peak hold or a time when a sensor is being utilized and/or monitored. In an embodiment, an ADC may transmit received photo voltaic sensor samples to a controller or processor, and a controller or processor may store values representing received photovoltaic sensor samples. In an embodiment, a controller may identify a highest (e.g., peak) value received from an ADC and/or a photovoltaic sensor, and a corresponding location of a photovoltaic sensor, a shading element and/or a shading object.

In an embodiment, a controller or processor may calculate a shortest path to a position identified as having a peak value of samples received from a photo voltaic sensor. In an embodiment, a controller or processor may send out commands or instructions which drive, directly or indirectly, a motor to cause a shading object and/or a shading element to reverse a direction of movement (e.g., opposite from a direction of a sweep) and move in the reverse direction until a shading object and/or shading element reaches a peak value position. In an embodiment, a controller or processor may send out commands or instructions which drive, directly or indirectly, a motor to cause a shading object and/or a shading element to maintain a direction it is moving until a shading object and/or shading element reaches a peak value position.

In an embodiment, a controller or processor transmits instructions and/or signals, directly or indirectly, to a motor to move a shading object and/or shading element about an elevation axis to monitor peak values received from a photo voltaic sensor. In an illustrative embodiment, a controller may monitor values received from a photo voltaic sensor moved about a portion and/or section of an elevation axis, e.g., perform a sweep of only a 45 degree to 90 degree portion of an elevation axis. In an embodiment, a controller or processor may identify a highest (e.g., peak) value received from the ADC converter and/or a photovoltaic sensor, and a corresponding location of a photovoltaic sensor, a shading element and/or a shading object. In an embodiment, after identifying a highest value from a photovoltaic sensor, a controller may generate commands, instructions or signals to directly, or indirectly, instruct a motor to move a shading object and/or shading element to a position on an elevation axis corresponding to a highest sample value from a photovoltaic sensor. In an embodiment, this may be referred to as a peak intensity position.

In an embodiment, a controller or processor may interface with a photo voltaic sensor on a regular or defined basis. In an illustrative embodiment, a controller or processor may interface with a photo voltaic sensor every 8 or 10 minutes. In an embodiment, if a controller or processor determines that a new peak intensity location occurs, a controller may instruct a shading object and/or a shading element to move to a newly determined peak intensity position. In an embodiment, a controller or processor may monitor output of a photo voltaic sensor. In an embodiment, if a photo voltaic sensor output is below a threshold level, a controller or processor may not generate commands to instruct a motor to move a shading object and/or shading object because there is not enough sunlight for a photo voltaic sensor to generate enough voltage and/or current. In other words, in an embodiment, a shading object and/or a shading element may stop moving because a light intensity in an environment drops below a certain level.

In an embodiment, a shading element of an intelligent shading object may utilize global positioning information to orient itself during operation and/or periods of non-operation. In an embodiment, a shading element, and/or other sections of a shading object may comprise a GPS receiver. In an illustrative embodiment, a GPS receiver may collect data from GPS/GNSS signals from satellites and other terrestrial transmitters in order to find out a location where a shading object may be located.

In an embodiment, a shading object comprises a compass. For example, a compass may be a digital compass. In an embodiment, a compass may be on located on a shading element. In an embodiment, a compass may be located on a support unit, or another component of an intelligent shading object. In an illustrative embodiment, a shading object may collect data generated by a compass in order to determine a geographic location and/or orientation of a shading object. In an embodiment, a shading object may check a time at a geographic location. In this illustrative embodiment, a time value in a geographic location may correspond to a location of a light source (e.g., a sun) in an environment.

In an embodiment, a controller in a shading object may utilize GPS location information from a GPS receiver, orientation information from a compass, and/or a location of a sun in an environment to determine an azimuth angle and an elevation angle for a shading element in a shading object. In an embodiment, a processor or controller may generate a signal to drive a motor to move a shading element to an orientation to increase protection from a sun or a light source. In an embodiment, a shading element may be moved to an orientation to capture a maximum amount of light energy from a sun and/or another light source.

In an embodiment, a controller may continue to receive GPS location information, orientation information from a compass, and/or a location of a sun in an environment and may continue to generate an azimuth angle and an elevation angle. In this illustrative embodiment, a controller may generate instructions and/or signals to cause a motor (or motors) to move a shading element corresponding to a generated azimuth and/or elevation angles. In an embodiment, a controller may cause a shading element to be moved incrementally to a location corresponding to a generated azimuth and/or elevation angles.

In an embodiment, a controller or processor may interface with a GPS receiver or sensor. In an embodiment, a GPS sensor may be a 2 axis GPS sun tracker. In an embodiment, a GPS receiver may utilize a latitude measurement, a longitude measurement, a reference time (e.g. a UTC and/or a GMT time), a local time, and/or a number of days since a start of a calendar year to calculate an elevation angle and/or an azimuth angle for movement of a shading object and/or a shading element. In an embodiment, a GPS sensor may transmit a latitude measurement, a longitude measurement, a reference time, a local time, and/or a number of days to a controller or processor. In an embodiment, a controller or processor may calculate an elevation angle and an azimuth angle for placement of a shading object and/or shading element based on one or more of the received readings. In an embodiment, a controller may generate instructions and/or send signals, directly or indirectly (e.g., through an interface and an amplifier) to a motor to drive a shading object and/or a shading element to a position perpendicular to rays of a light source, (e.g., sun).

In an embodiment, a shading object and/or a shading element may comprise a digital compass. In an embodiment, a digital compass may be a 3-axis digital compass. In an embodiment, a digital compass may first find true north and then determine a shading object's location with respect to true north (e.g., a shading object's orientation). Once a shading element's orientation is determined, in an embodiment, a controller or processor may instruct and/or transmit signals, directly or indirectly (through an interface and/or amplifier) to a motor to move a shading object and/or a shading element to a desired orientation. In an embodiment, if a shading object and/or a shading element may be moved (e.g., a user moves a shading element to provide shade for a different person or in a different location), a digital compass may calculate a new position after a shading object is moved.

In an embodiment, a shading object may comprise a motion detector. In an embodiment, a shading object may include a memory, integrated with, or separate from a controller or processor. A memory, may have stored therein, shading object settings corresponding to previous locations and/or times of day. In an embodiment, a controller or processor may compare a current geographic location to stored locations in a memory. In an embodiment, if a match to a stored location is determined, a controller may transmit commands, instructions, and/or signals to inform a user (via a control panel or a user interface of a electronic device or a computing device) that a location match has occurred, and ask a user if a controller or processor should generate commands, instructions or transmit signals (indirectly or directly) to cause a motor (or motors) to utilize shading object settings in configuring an intelligent shading object.

In an embodiment, a motion detector may identify if a shading objection has been moved. In an embodiment, a motion detector may operate even if a shading object is in a powered down mode. In an embodiment, a motion detector may be an accelerometer and/or a gyroscope. In an embodiment, a controller or processor in a shading object may monitor a motion detector. In an illustrative embodiment, a controller or processor may monitor a motion detector once a controller or processor enters a power on operational state. If a motion detector generates a signal identifying movement, a controller or processor may acquire new readings from a sun sensor and/or a global positioning sensor.

In an embodiment, an intelligent shading object (and/or sections of an intelligent shading object) may be controlled by a number of electronic devices. For example, in this context, sections may comprise a shading element (or shading element), a first motor and controller, a second motor and controller, a support unit, a storage unit, a misting system, a Bluetooth unit, a power and/or battery management system, a projection unit, and/or a base unit. In an embodiment, a controlling electronic device may be a remote control, a laptop computer, a cellular phone, a smart phone, a tablet, a digital music player and/or other computing devices. In an embodiment, one electronic device (or computing device) may control most functions and in another embodiments, one or more electronic devices (or computing devices) may control different sections of a shading object. This may be beneficial when an electronic device becomes non-operational (e.g., loses power or is out of range) or when only a specific electronic device may be operated with a specific environment.

In an embodiment, a shading object may comprise a wireless digital music player. In an illustrative embodiment, a wireless digital music player may comprise a Bluetooth MP3 player. In an embodiment, a controller or processor may be separate and/or independent of a controller. In an embodiment, a controller or processor and a wireless digital music player may be integrated on a chip. In an embodiment, a wireless digital music player may pair with a digital audio music source. In an embodiment, a digital music player may establish a communication session with a digital audio music source. In an embodiment, a digital audio music source may be a smartphone and/or a computing device. After a wireless digital music player has established a communication session with a digital audio music source, a digital audio music source may stream digital audio to a wireless digital music player. A wireless digital music player may receive digital audio and transmit received digital audio to a speaker for playback. In an embodiment, a wireless digital music player may have an integrated speaker, or alternatively, a speaker assembly may be located on support stand, a base assembly, or a shading element of a shading object. In an embodiment, a wireless digital music player may comprise a user interface for controlling operation, such as up/down volume, pause, turning device on/off. In an embodiment, a shading object may comprise a control panel for communicating with and/or controlling operation of a wireless digital music player, such as up/down volume, pause, turning device on/off. In an embodiment, a digital audio music source (e.g., smartphone) may comprise a user interface for communicating with and/or controlling operation of a wireless digital music player.

In an embodiment, an intelligent shading object may comprise a camera. In this embodiment, an intelligent shading object may comprise instructions, stored in a memory, which when executed by a controller and/or a processor, may cause a processor to implement facial recognition software functions.

In an embodiment, a shading object may comprise a processor, memory, and a controller. In an embodiment, software instructions may be stored in a memory of a controller. In an embodiment, software instructions may be executed by a processor, and perform facial recognition on individuals in a vicinity of a shading object. In an embodiment, a shading object may comprise an imaging device, e.g., a digital camera. In an embodiment, an imaging device may monitor an area around a shading object and may capture images of individuals within an area. In an embodiment, an imaging device may capture still images and/or video images. In an embodiment, an imaging device may transmit captured images to a wireless receiver in an intelligent shading object. In an embodiment, an imaging device may initiate a transmission, or in another embodiment, a wireless transceiver may request a digital image transmission. In an embodiment, a wireless transceiver may transfer and/or transmit a received digital image to a controller or processor in a shading object. In an embodiment, a controller or processor may compare a received digital image to reference digital images of individuals, e.g., individuals who utilize a shading object and whose images may have been stored in a memory of a controller and/or a separate memory of a shading object. In an embodiment, digital images of individuals may be facial digital images. In an embodiment, digital images of individuals may be body digital images (either portions of body or full body). If a controller or processor finds a match between a received digital image and one of a reference digital images, a controller or processor may set an indicator that a match with an individual has been identified. In an embodiment, a controller or processor may retrieve personal settings for a matched individual. In an embodiment of an invention, personal settings may be for different aspects of a shading object. For example, personal settings may be comprised of wireless digital music player settings (e.g., volume, a playlist), umbrella location settings (e.g., azimuth and/or elevation settings), cooling mist settings, video projection settings, and/or light projection settings. In an embodiment, a controller or processor may transmit commands and/or signals associated with above-identified settings directly or indirectly to a wireless digital music player to establish music player settings, to a motor to place a shading object and/or shading element in established umbrella location setting, to a cooling mist system, a video projector, and/or a light projector. In an embodiment, a controller.

In an embodiment, a captured image may be compared to an individual's known reference image. In an illustrative example, a controller or processor, executing facial recognition software stored in the memory may compare a captured image to an individuals' known reference image and identify if any significant differences are present between the images. For example, in an embodiment, a comparison by a controller or processor may note if skin color or tone has changed and is redder than normal, which may indicate that an individual has a sunburn. In an illustrative embodiment, a controller or processor may transmit instructions or signals to an audio receiver to generate voice commands telling an individual to utilize a shading object and/or stay within a shading area.

Figure 14:
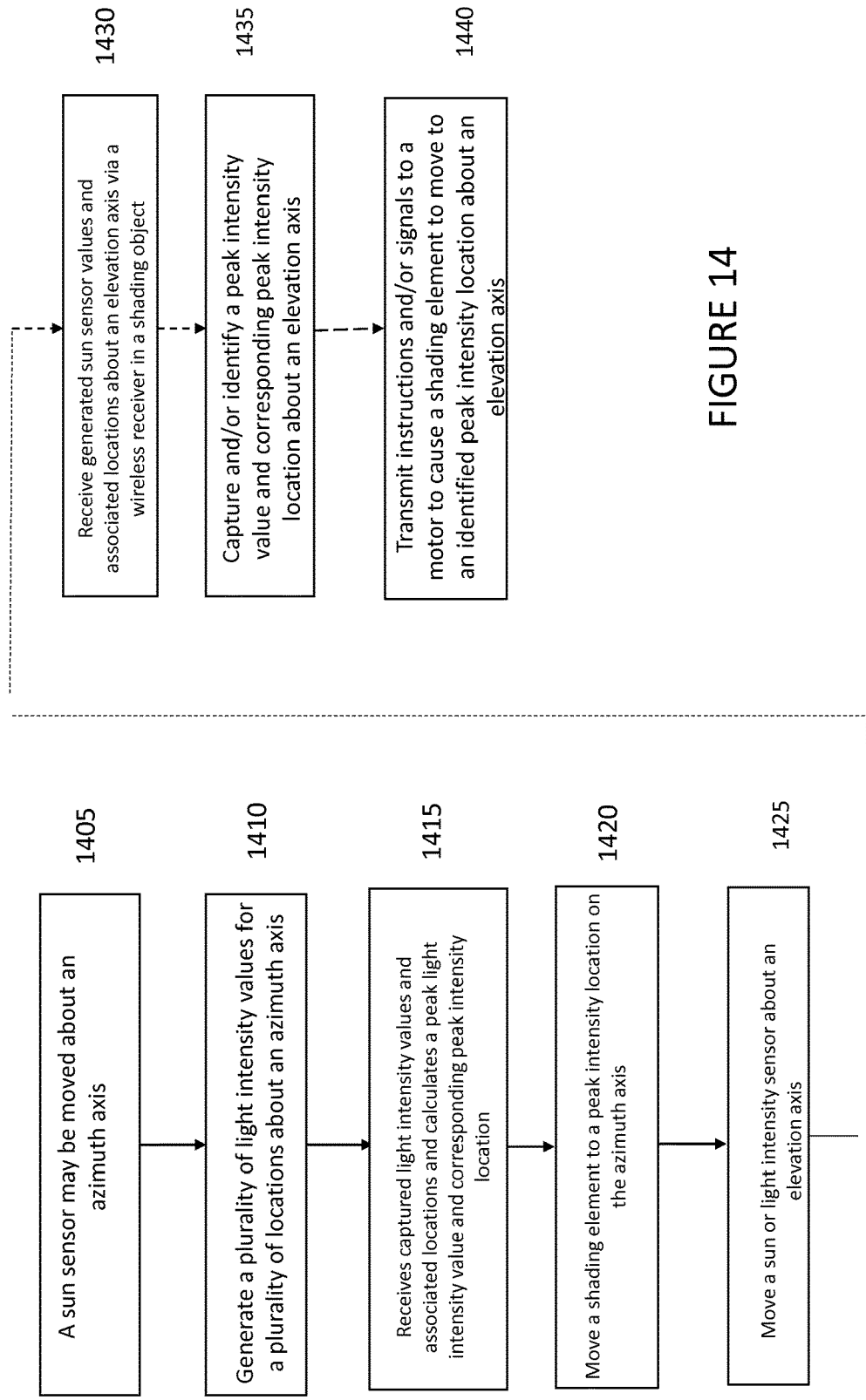
FIG. 14 is a flow diagram of an embodiment of a process to position a shading object in a shading element.

FIG. 14 is a flow diagram of an embodiment of a process to position a shading object in a shading element. Of course, embodiments are intended to be illustrative examples rather than be limiting with respect to claimed subject matter. Likewise, for ease of explanation, an embodiment may be simplified to illustrate aspects and/or features in a manner that is intended to not obscure claimed subject matter through excessive specificity and/or unnecessary details. Embodiments in accordance with claimed subject matter may include all of, less than, or more than blocks 1405-1440. Also, the order of blocks 1405-1440 is merely as an example order.

FIG. 14, describes, in an embodiment, positioning of a shading element in a shading object. Referring to FIG. 14, in block 1405, in an embodiment, a sun sensor coupled and/or connected to a shading element may be moved about an azimuth axis. In an embodiment, a controller or processor may generate instructions to cause a sun sensor coupled to the shading element may perform a 360° sweep of an azimuth axis. In block 1410, in an embodiment, a sun sensor may generate a plurality of light intensity values for a plurality of locations about an azimuth axis. In other words, in an embodiment where a 360° sweep is performed along an azimuth axis, hundreds and/or thousands of sample values of light intensity values corresponding to locations along an azimuth axis may be generated and/or captured.

At block 1415, a controller or processor may receive captured light intensity values and associated locations and calculate a peak light intensity value and corresponding peak intensity location. In an embodiment, at block 1420, a controller or processor transmits commands and/or signals, directly or indirectly, to a motor to move a shading element to a peak intensity location on the azimuth axis.

In an embodiment, at block 1425, a controller or processor transmits instructions and/or signals, directly or indirectly, to a motor to move a shading element and/or other shading element sections, which may have a sun or light intensity sensor. In an embodiment, a sun sensor or light intensity sensor may move about an elevation axis. In an illustrative embodiment, a sun sensor may move between 45 and 90 degrees about and/or around an elevation axis.

In an embodiment, at block 1430, a sun sensor may generate a plurality of sun sensor values and associated locations about an elevation axis and may transmit generated sun sensor values and associated location via a wireless transceiver in a shading object and further to a controller or processor. In an embodiment, a memory in a shading object may store generated light sensor values and associated locations on an elevation axis.

In an embodiment, at block 1435, a controller or processor may monitor received light sensor values and associated locations. Continuing with this illustrative embodiment, a controller or processor may capture and/or identify a peak intensity value and corresponding peak intensity location about an elevation axis.

In an embodiment, at block 1440, a controller or processor may generate and transmit instructions and/or signals, directly or indirectly, to a motor to cause a shading element to move to an identified peak intensity location about an elevation axis (e.g., in a vertical direction).

Figure 15:
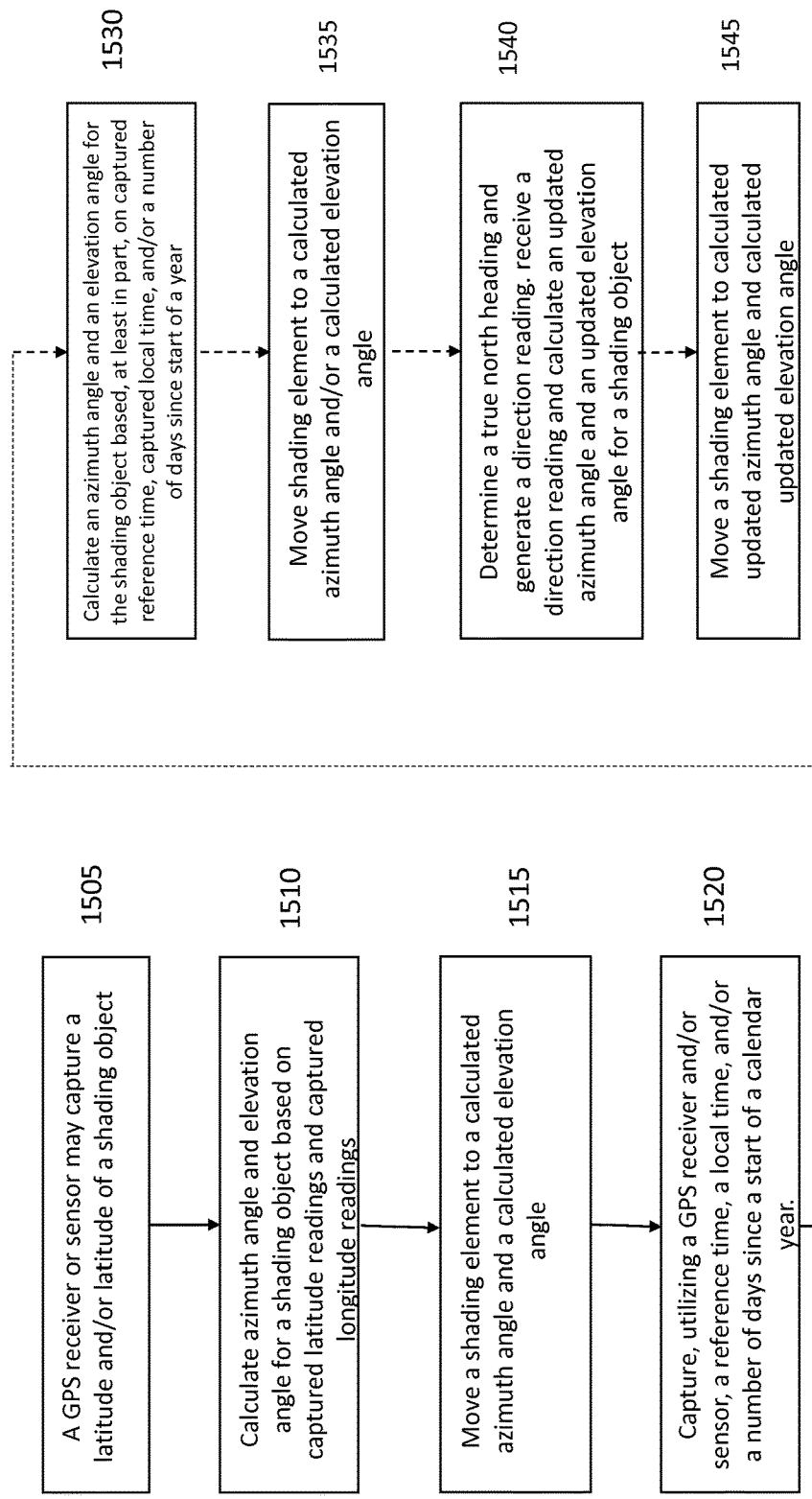
FIG. 15 is a flow diagram of an embodiment of a process to position a shading object in a shading element utilizing a global positioning sensor or receiver.

FIG. 15 is a flow diagram of an embodiment of a process to position a shading object in a shading element utilizing a global positioning sensor and/or receiver. Of course, embodiments are intended to be illustrative examples rather than be limiting with respect to claimed subject matter. Likewise, for ease of explanation, an embodiment may be simplified to illustrate aspects and/or features in a manner that is intended to not obscure claimed subject matter through excessive specificity and/or unnecessary details. Embodiments in accordance with claimed subject matter may include all of, less than, or more than blocks 1505-1545. Also, the order of blocks 1505-1545 is merely as an example order.

In an embodiment, an intelligent shading object may comprise a global positioning system (GPS) receiver and/or sensor. In an embodiment, a GPS receiver and/or sensor may be located and/or installed on a shading element, a support unit, a base unit, a projection unit, and/or any section of a shading object. In an embodiment, at step 1505, a GPS receiver, installed on a portion and/or component of an intelligent shading object, may capture and/or receive a latitude and/or latitude of an intelligent shading object.

In an embodiment, at step 1510, a controller or processor may receive captured latitude and longitude values and may calculate an azimuth angle and/or an elevation angle for a shading object based, at least in part, on captured latitude readings and/or captured longitude readings. In an embodiment, at step 1515, a controller may generate and transmit instructions and/or signals, directly or indirectly, to a motor to cause a motor to move a shading element to a calculated azimuth angle and a calculated elevation angle.

In an embodiment, at step 1520, a GPS receiver, coupled and/or connected to a shading object, may capture, utilizing a GPS receiver and/or sensor, a reference time, a local time, and/or a number of days since a start of a calendar year. In an embodiment, a controller or processor may receive a captured reference time, captured local time, and/or a captured number of days since a start of a year. In an embodiment, at step 1530, a controller or processor may calculate an azimuth angle and an elevation angle for an intelligent shading object based, at least in part, on a captured reference time, captured local time, and/or a number of days since start of a year. In an embodiment, at step 1535, a controller or processor may generate and/or transmit commands or signals, directly or indirectly, to a motor to cause a motor to move a shading element to a calculated azimuth angle and/or a calculated elevation angle.

In an embodiment, in step 1540, a digital compass may determine a true North heading and/or generate a direction reading for a shading object. In an embodiment, a controller may receive a direction reading and calculate an updated azimuth angle and an updated elevation angle for a shading object based, at least in part, on a calculated direction reading. In an embodiment, in step 1545, a controller or processor may generate and/or transmit instructions and/or signals, directly or indirectly to a motor, to cause a motor to move a shading element to a position corresponding to a calculated updated azimuth angle and a calculated updated elevation angle.

Figure 16:
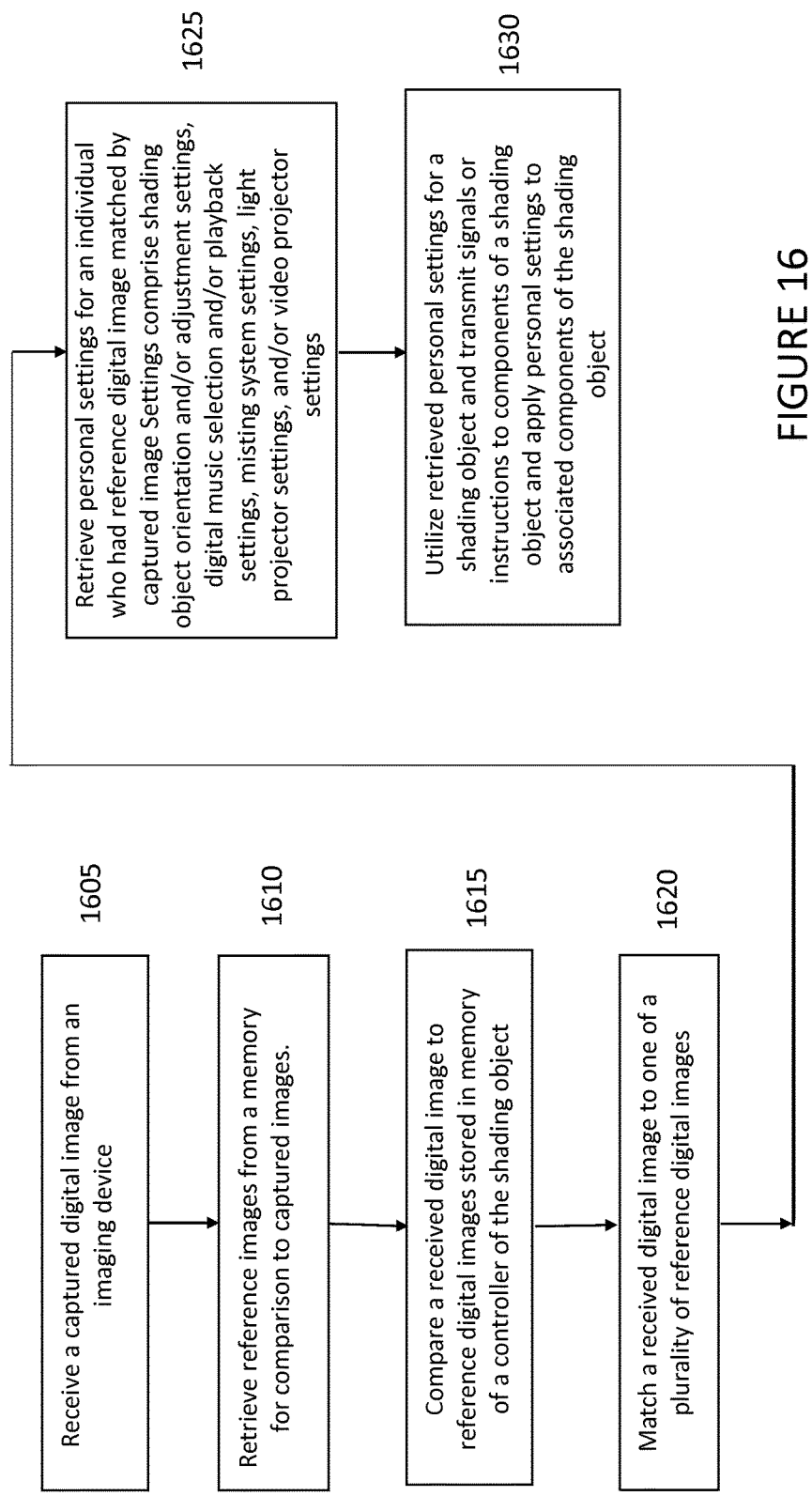
FIG. 16 is a flow diagram of an embodiment of a process to apply personal settings to a shading object.

FIG. 16 is a flow diagram of an embodiment of a process to apply personal settings to a shading object. Of course, embodiments are intended to be illustrative examples rather than be limiting with respect to claimed subject matter. Likewise, for ease of explanation, an embodiment may be simplified to illustrate aspects and/or features in a manner that is intended to not obscure claimed subject matter through excessive specificity and/or unnecessary details. Embodiments in accordance with claimed subject matter may include all of, less than, or more than blocks 1605-1630. Also, the order of blocks 1605-1630 is merely as an example order.

In an embodiment, an imaging device may capture an image of an individual in an area in which a shading object is placed. In an embodiment, an imaging device comprises a digital camera, a video camera, a smart phone, and other similar device. In an embodiment, at step 1605, an imaging device may transmit a captured image to a wireless transceiver in a shading object and a wireless transceiver may receive the captured image.

In an embodiment, a shading object may comprise a controller or processor, and a memory. A memory may comprise and have stored therein reference images of individuals for comparison. In an embodiment, at step 1610, a controller may retrieve reference images from a memory. In an embodiment, at step 1615, a controller may compare a received digital image to reference digital images stored in memory of a controller of the shading object.

In an embodiment, at step 1620, a controller may match a received digital image to one of a plurality of reference digital images. In an embodiment, personalized settings for an individual may be stored in a memory of a shading object. In an illustrative embodiment, personalized settings may comprise shading object orientation and/or adjustment settings, digital music selection and/or playback settings, misting system settings, light projector settings, and/or video projector settings, along with other similar settings.

In an embodiment, at step 1625, a controller may retrieve personal settings for an individual who had a reference digital image matched with captured image.

In an embodiment, at step 1630, a controller may utilize retrieved personal settings for a shading object and transmit signals or instructions to components of a shading object and apply personal settings to associated components of the shading object. In an illustrative example, if personal settings are for shading object orientation and location settings, a controller or processor may transmit instructions and/or signals, directly or indirectly, to a motor to cause a shading object and/or a shading element to move to a desired orientation and/or location on, for example, an azimuth axis and/or an elevation axis. In an illustrative example, a controller or processor may communicate instructions and/or signals, directly or indirectly, to a digital music player which may cause a digital music player to start playing an individual's playlist. In an illustrative embodiment, a controller or processor may communicate audio signals directly or indirectly to a speaker with a personalized greeting for an individual. In an illustrative embodiment, a controller or processor may communicate instructions and/or signals, directly or indirectly, to a misting system to mist an area at a predetermined intensity. Similarly, in an illustrative embodiment, a controller or processor may communicate instructions and/or signals to a light and/or video projection system with light settings desired by an individual and/or video settings desired by an individual.

A computing device may be a server, a computer, a laptop computer, a mobile computing device, and/or a tablet. A computing device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

Internal architecture of a computing device includes one or more processors (also referred to herein as CPUs), which interface with at least one computer bus. Also interfacing with computer bus are persistent storage medium/media, network interface, memory, e.g., random access memory (RAM), run-time transient memory, read only memory (ROM), etc., media disk drive interface, an interface for a drive that can read and/or write to media including removable media such as floppy, CD-ROM, DVD, etc., media, display interface as interface for a monitor or other display device, keyboard interface as interface for a keyboard, mouse, trackball and/or pointing device, and other interfaces not shown individually, such as parallel and serial port interfaces, a universal serial bus (USB) interface, and the like.

Memory, in a computing device and/or an intelligent shading object system, interfaces with computer bus so as to provide information stored in memory to processor during execution of software programs such as an operating system, application programs, device drivers, and software modules that comprise program code or logic, and/or computer-executable process steps, incorporating functionality described herein, e.g., one or more of process flows described herein. CPU first loads computer-executable process steps or logic from storage, e.g., memory 1004, storage medium/media, removable media drive, and/or other storage device. CPU can then execute the stored process steps in order to execute the loaded computer-executable process steps. Stored data, e.g., data stored by a storage device, can be accessed by CPU during the execution of computer-executable process steps.

Persistent storage medium/media is a computer readable storage medium(s) that can be used to store software and data, e.g., an operating system and one or more application programs, in a computing device or storage subsystem of an intelligent shading object. Persistent storage medium/media also be used to store device drivers, such as one or more of a digital camera driver, monitor driver, printer driver, scanner driver, or other device drivers, web pages, content files, metadata, playlists and other files. Persistent storage medium/media 1006 can further include program modules/program logic in accordance with embodiments described herein and data files used to implement one or more embodiments of the present disclosure.

A computing device or a processor or controller may include or may execute a variety of operating systems, including a personal computer operating system, such as a Windows, iOS or Linux, or a mobile operating system, such as iOS, Android, or Windows Mobile, or the like. A computing device, or a processor or controller in an intelligent shading controller may include or may execute a variety of possible applications, such as a software applications enabling communication with other devices, such as communicating one or more messages such as via email, short message service (SMS), or multimedia message service (MMS), including via a network, such as a social network, including, for example, Facebook, LinkedIn, Twitter, Flickr, or Google-F, to provide only a few possible examples. A computing device or a processor or controller in an intelligent shading object may also include or execute an application to communicate content, such as, for example, textual content, multimedia content, or the like. A computing device or a processor or controller in an intelligent shading object may also include or execute an application to perform a variety of possible tasks, such as browsing, searching, playing various forms of content, including locally stored or streamed content. The foregoing is provided to illustrate that claimed subject matter is intended to include a wide range of possible features or capabilities. A computing device or a processor or controller in an intelligent shading object may also include imaging software applications for capturing, processing, modifying and transmitting image files utilizing the optical device (e.g., camera, scanner, optical reader) within a mobile computing device.

Network link typically provides information communication using transmission media through one or more networks to other devices that use or process the information. For example, network link may provide a connection through a network (LAN, WAN, Internet, packet-based or circuit-switched network) to a server, which may be operated by a third party housing and/or hosting service. For example, the server may be the server described in detail above. The server hosts a process that provides services in response to information received over the network, for example, like application, database or storage services. It is contemplated that the components of system can be deployed in various configurations within other computer systems, e.g., host and server.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a system or module is a software, hardware, or firmware (or combinations thereof), process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all implementations falling within the scope of the appended claims, and equivalents thereof.

What is claimed is:

1. An intelligent shading object, comprising:
 a plurality of shading elements, each of the plurality of shading elements independently linked to an expansion and retraction unit;
 a central support system, the central support system comprising:
 a first motor integrated within the central support system;
 a storage area to house the plurality of shading elements;
 the expansion and retraction unit to drive displacement of the plurality of shading elements; and
 a controller, the controller and the first motor integrated into the central support system, where the controller transmits instructions to the first motor to communicate signals to the expansion and retraction unit to deploy one or more of the plurality of shading elements, where the one or more shading elements are individually selected and deployed; and
 a base unit in contact with a floor surface and directly connected to the central support system, the base unit comprising:
 a second motor,
 a power supply, and
 a rotational apparatus to rotate the central support system in response to signals from the second motor;
 wherein a first shading element of the plurality of shading elements is configured to be deployed in a first position and a second shading element of the plurality of shading elements is configure to be deployed in a second position offset from the first position, and wherein a portion of the second shading element is configured to overlap a portion of the first shading element.

2. The intelligent shading object of claim 1, wherein each of the plurality of shading elements has different lengths.

3. The intelligent shading object of claim 1, wherein at least one of the plurality of shading elements has a different geometric shape as compared to a remainder of the shading elements.

4. The intelligent shading object of claim 1, wherein the central support system further comprises a light sensor to identify presence and intensity of solar irradiance, the light sensor being coupled to a second controller in the base unit, wherein the second controller transmits signals to the second motor in the base unit to send signals to the rotational apparatus to rotate the base and the central support system to follow a direction of the solar irradiance.

5. The intelligent shading object of claim 1, the central support system further including a wireless receiver to receive audio signals and transmit the audio signals to a speaker.

6. The intelligent shading object of claim 1, wherein at least one of the plurality of shading elements has photo cells disposed on a surface of the at least one shading element.

7. The intelligent shading object of claim 6, wherein the photo cells transform solar irradiance into electrical energy, which is stored in a power storage element and is utilized to provide power to at least one of the controller, the first motor, or the second motor.

8. The intelligent shading object of claim 6, wherein the base unit further comprises a plurality of weight compartments, wherein at least one weight may be placed into one of the plurality of weight compartments.

9. The intelligent shading object of claim 6, the central support system further including a lighting element, the lighting element to project light onto a surface of at least one of the shading elements.

10. The intelligent shading object of claim 9, the lighting element to further project video or pictures onto a surface of at least one of the shading elements.

11. The intelligent shading object of claim 6, wherein the photo cells transform solar irradiance into electrical power, the electrical power being provided to one of a system power supply or a rechargeable battery, the one of the system power supply or the rechargeable battery providing power to at least one of the controller, the first motor, or the second motor.

12. The intelligent shading object of claim 6, further comprising a power monitor, the power monitor generating a measurement of how much electrical power is available from a rechargeable battery.

13. The intelligent shading object of claim 1, further comprising a Global Navigation Satellite System (GNSS) transceiver, the GNSS transceiver to receive Global Positioning System (GPS) signals from GPS satellites and gather positioning information for the intelligent shading object.

14. An intelligent shading object, comprising:
 a plurality of shading elements;
 a shading element deployment mechanism to select and deploy a first shading element to a first position and separately select and deploy a second shading element to a second position, the first position being different from the second position, wherein the first position is offset from the second position and a portion of the first shading element overlaps a portion of the second shading element;
 a support structure coupled to the shading element deployment mechanism, the support structure having a top end and a bottom end;
 a base unit directly connected to the bottom end of the support structure;
 a speaker; and
 a transceiver connected to the support structure and coupled to the speaker, the transceiver to receive audio signals from an audio source and to transmit the audio signals to the speaker, wherein the speaker produces sound from the received audio signals.

15. The intelligent shading object of claim 14, wherein the transceiver is only activated when the plurality of shading elements are deployed in an open position.

16. An intelligent shading object, comprising:
 a plurality of shading elements;
 a shading element deployment mechanism to select and deploy a first element rod and a first shading element of the plurality of shading elements to a first position and separately select and deploy a second element rod and a second shading element of the plurality of shading elements to a second position, the first position being different from the second position, wherein a proximal end of the first element rod and a proximal end of the second element rod are connected to the shading element deployment mechanism, a distal end of the first element rod is connected to the first shading element and a distal end of the second element rod is connected to the second shading element;

a support structure coupled to the shading element deployment mechanism, the support structure having a top end and a bottom end; and a base unit directly connected to the bottom end of the support structure to provide stability to the support structure, the shading element deployment mechanism, and the plurality of shading elements.

17. The intelligent shading object of claim 16, wherein the first shading element has a first deployment length and the second shading element has a different second deployment length.

18. The intelligent shading object of claim 16, further comprising a storage area to house the plurality of shading elements, the support structure deployment mechanism to drive displacement of the plurality of shading elements through an opening in a top surface of the storage area.

19. The intelligent shading object of claim 16, wherein the first shading element is configured to automatically deploy to a first vertical height and the second shading element is configured to automatically deploy to a second lower vertical height.

20. An intelligent shading object comprising:

a first shading element, a second shading element, and a third shading element, the first shading element being physically separate from the second shading element and the third shading element and the second shading element being physically separate from the third shading element;

a first support structure, a second support structure and a third support structure, a proximal end of the first support structure, the second support structure and the third support structure connected to a proximal end of the first shading element, a proximal end of the second shading element and a proximal end of the third shading element, respectively;

a support structure deployment mechanism to deploy the first support structure, the second support structure, and the third support structure, the first support structure, second support structure, and third support structure to be deployed independent of each other;

a central support structure coupled to the support structure deployment mechanism, the central support structure having a top end and a bottom end; and a base unit directly connected to the bottom end of the central support structure to provide stability to the first support structure, the second support structure, the third support structure, the support structure deployment mechanism, the first shading element, the second shading element and the third shading element.

* * * * *